United States Patent
Selinger et al.

(10) Patent No.: US 8,595,411 B2
(45) Date of Patent: Nov. 26, 2013

(54) METHOD AND CONTROLLER FOR PERFORMING A SEQUENCE OF COMMANDS

(75) Inventors: Robert D. Selinger, San Jose, CA (US); Gary Lin, San Jose, CA (US); Chaoyang Wang, Cupertino, CA (US)

(73) Assignee: SanDisk Technologies Inc., Plano, TX (US)

( * ) Notice: Subject to any disclaimer, the term of this patent is extended or adjusted under 35 U.S.C. 154(b) by 851 days.

(21) Appl. No.: 12/650,255

(22) Filed: Dec. 30, 2009

(65) Prior Publication Data

US 2011/0161554 A1 Jun. 30, 2011

(51) Int. Cl.
G06F 13/00 (2006.01)

(52) U.S. Cl.
USPC .......................................... 711/103

(58) Field of Classification Search
None
See application file for complete search history.

(56) References Cited

U.S. PATENT DOCUMENTS

| | | | |
|---|---|---|---|
| 5,404,485 | A | 4/1995 | Ban |
| 5,434,825 | A | 7/1995 | Harari |
| 5,532,962 | A | 7/1996 | Auclair et al. |
| 5,799,168 | A | 8/1998 | Ban |
| 5,818,757 | A | 10/1998 | So et al. |
| 5,937,425 | A | 8/1999 | Ban |
| 5,943,283 | A | 8/1999 | Wong et al. |
| 6,034,882 | A | 3/2000 | Johnson et al. |
| 6,119,245 | A | 9/2000 | Hiratsuka |
| 6,181,599 | B1 | 1/2001 | Gongwer |
| 6,185,122 | B1 | 2/2001 | Johnson et al. |
| 6,230,233 | B1 | 5/2001 | Lofgren et al. |
| 6,420,215 | B1 | 7/2002 | Knall et al. |
| 6,426,893 | B1 | 7/2002 | Conley et al. |
| 6,498,851 | B1 | 12/2002 | Wong |
| 6,591,330 | B2 | 7/2003 | Lasser |
| 6,594,183 | B1 | 7/2003 | Lofgren et al. |
| 6,624,773 | B2 | 9/2003 | Wong |

(Continued)

FOREIGN PATENT DOCUMENTS

| | | |
|---|---|---|
| EP | 1 146 428 | 10/2001 |
| WO | WO 2005/066773 | 7/2005 |
| WO | WO 2009/088920 | 7/2009 |

OTHER PUBLICATIONS

"Notification of the First Office Action" (with translation) for Chinese patent application No. 200680035631.0, 14 pages, Jul. 13, 2010.

(Continued)

*Primary Examiner* — Andrew Caldwell
*Assistant Examiner* — Benjamin Geib
(74) *Attorney, Agent, or Firm* — Brinks Gilson & Lione

(57) ABSTRACT

The embodiments described herein provide a method and controller for performing a sequence of commands. In one embodiment, a controller receives a command from a host to perform a memory operation in a flash memory device, wherein the command comprises at least one bit that indicates whether the command is a stand-alone command or is part of a sequence of commands. The controller analyzes the at least one bit to determine whether the at least one bit indicates that the command is a stand-alone command or is part of a sequence of commands. If the at least one bit indicates that the command is a stand-alone command, the controller performs the command. If the at least one bit indicates that the command is part of a sequence of commands, the controller performs the command as part of the sequence of commands.

20 Claims, 11 Drawing Sheets

(56) References Cited

U.S. PATENT DOCUMENTS

| | | | |
|---|---|---|---|
| 6,631,085 B2 | 10/2003 | Kleveland et al. | |
| 6,683,817 B2 | 1/2004 | Wei et al. | |
| 6,694,415 B2 | 2/2004 | March et al. | |
| 6,715,044 B2 | 3/2004 | Lofgren et al. | |
| 6,721,820 B2 | 4/2004 | Zilberman et al. | |
| 6,760,805 B2 | 7/2004 | Lasser | |
| 6,988,175 B2 | 1/2006 | Lasser | |
| 7,012,835 B2 | 3/2006 | Gonzalez et al. | |
| 7,081,377 B2 | 7/2006 | Cleeves | |
| 7,120,729 B2 | 10/2006 | Gonzalez et al. | |
| 7,136,973 B2 | 11/2006 | Sinclair | |
| 7,149,119 B2 | 12/2006 | Fasoli | |
| 7,170,788 B1 | 1/2007 | Wan et al. | |
| 7,171,536 B2 | 1/2007 | Chang et al. | |
| 7,177,191 B2 | 2/2007 | Fasoli | |
| 7,177,977 B2 | 2/2007 | Chen et al. | |
| 7,187,583 B2 | 3/2007 | Yang et al. | |
| 7,218,552 B1 | 5/2007 | Wan et al. | |
| 7,224,607 B2 | 5/2007 | Gonzalez et al. | |
| 7,234,049 B2 | 6/2007 | Choi et al. | |
| 7,239,556 B2 | 7/2007 | Abe et al. | |
| 7,262,994 B2 | 8/2007 | Fong et al. | |
| 7,295,473 B2 | 11/2007 | Fong et al. | |
| 7,345,907 B2 | 3/2008 | Scheuerlein | |
| 7,349,258 B2 | 3/2008 | Fong et al. | |
| 7,355,888 B2 | 4/2008 | Hemink et al. | |
| 7,355,889 B2 | 4/2008 | Hemink et al. | |
| 7,362,604 B2 | 4/2008 | Scheuerlein | |
| 7,366,029 B2 | 4/2008 | Kagan | |
| 7,379,330 B2 | 5/2008 | Conley et al. | |
| 7,379,334 B2 | 5/2008 | Murakami et al. | |
| 7,392,343 B2 | 6/2008 | Oshima | |
| 7,406,572 B1 | 7/2008 | Nguyen | |
| 7,426,137 B2 | 9/2008 | Hemink | |
| 7,433,241 B2 | 10/2008 | Dong et al. | |
| 7,436,713 B2 | 10/2008 | Hemink | |
| 7,440,318 B2 | 10/2008 | Fong et al. | |
| 7,440,323 B2 | 10/2008 | Lutze et al. | |
| 7,443,736 B2 | 10/2008 | Samachisa | |
| 7,447,065 B2 | 11/2008 | Fong et al. | |
| 7,447,066 B2 | 11/2008 | Conley et al. | |
| 7,450,430 B2 | 11/2008 | Hemink et al. | |
| 7,463,531 B2 | 12/2008 | Hemink et al. | |
| 7,464,259 B2 | 12/2008 | Sukegawa et al. | |
| 7,468,911 B2 | 12/2008 | Lutze et al. | |
| 7,468,918 B2 | 12/2008 | Dong et al. | |
| 7,475,184 B2 | 1/2009 | Lee | |
| 7,477,547 B2 | 1/2009 | Lin | |
| 7,495,956 B2 | 2/2009 | Fong et al. | |
| 7,499,326 B2 | 3/2009 | Hemink | |
| 7,631,245 B2 | 12/2009 | Lasser | |
| 8,180,981 B2 * | 5/2012 | Kapil et al. | 711/159 |
| 8,250,287 B1 * | 8/2012 | Mirichigni | 711/103 |
| 2001/0028523 A1 | 10/2001 | Moro et al. | |
| 2003/0028704 A1 | 2/2003 | Mukaida et al. | |
| 2003/0051118 A1 | 3/2003 | Wu et al. | |
| 2003/0065899 A1 | 4/2003 | Gorobets | |
| 2003/0079077 A1 | 4/2003 | Piau et al. | |
| 2003/0097520 A1 | 5/2003 | Lai et al. | |
| 2003/0099134 A1 | 5/2003 | Lasser et al. | |
| 2003/0135688 A1 | 7/2003 | Tai | |
| 2003/0206442 A1 | 11/2003 | Tang et al. | |
| 2004/0103234 A1 | 5/2004 | Zer et al. | |
| 2004/0205418 A1 | 10/2004 | Sakaue et al. | |
| 2005/0050235 A1 | 3/2005 | Choi | |
| 2005/0055479 A1 | 3/2005 | Zer et al. | |
| 2005/0092846 A1 | 5/2005 | Lai et al. | |
| 2005/0172065 A1 | 8/2005 | Keays | |
| 2005/0180209 A1 | 8/2005 | Lasser | |
| 2005/0207231 A1 | 9/2005 | Kim | |
| 2005/0237814 A1 | 10/2005 | Li et al. | |
| 2005/0286306 A1 | 12/2005 | Srinivasan et al. | |
| 2006/0184709 A1 | 8/2006 | Sukegawa et al. | |
| 2006/0239450 A1 | 10/2006 | Holtzman et al. | |
| 2007/0047306 A1 | 3/2007 | Roohparvar | |
| 2007/0074093 A1 | 3/2007 | Lasser et al. | |
| 2007/0088940 A1 | 4/2007 | Conley | |
| 2007/0170268 A1 | 7/2007 | Lee | |
| 2007/0263440 A1 | 11/2007 | Cornwell et al. | |
| 2008/0046630 A1 | 2/2008 | Lasser | |
| 2008/0046641 A1 | 2/2008 | Lasser | |
| 2008/0151618 A1 | 6/2008 | Sharon et al. | |
| 2008/0158948 A1 | 7/2008 | Sharon et al. | |
| 2008/0243954 A1 | 10/2008 | Augenstein et al. | |
| 2010/0023800 A1 | 1/2010 | Harari et al. | |
| 2011/0040924 A1 | 2/2011 | Selinger | |
| 2011/0041005 A1 | 2/2011 | Selinger | |
| 2011/0041039 A1 | 2/2011 | Harari et al. | |

OTHER PUBLICATIONS

Cooke, J., Microsoft WinHec 2007, "Flash Memory Technology Direction", Apr. 30, 2007, pp. 1-11.

Cooke, J., Powerpoint Presentation, Flash Memory Summit, "NAND 101, An Introduction to NAND Flash and How to Design It in to Your Next Product", Aug. 8, 2006, pp. 1-68.

Denali Software, "Spectra™ NAND Flash File System", http://www.denali.com/en/products/spectra_ffs.isp, copyright 1994-2009, retrieved on Aug. 6, 2009, pp. 1-3.

EE Times Asia, "Toshiba Mixes LBA to NAND Flash Memory", http://www.eetasia.com/ARTP_8800428816_499486.HTM, posted on Aug. 9, 2006, 1 page.

Grimsrud, K., Powerpoint Presentation, "Intel Developer Forum", 2007, pp. 1-30.

Heye, R., Powerpoint Presentation, "Microsoft WinHec 2008 Advancing the Platform-MLC NAND in the PC, Planning for Success", 2008, pp. 1-34.

"Innovation, Simplify Embedded NAND Flash Design", Adverstisement, 1 page.

Inoue, A. et al., "NAND Flash Applications Design Guide, System Solutions from Toshiba America Electronic Components, Inc.", Revision 1.0, Apr. 2003, pp. 1-29.

Roohparvar, F., Powerpoint Presentation, Flash Memory Summit, "The Future of Wireless Flash", Aug. 2006, pp. 1-29.

"Simplify MLC NAND Design with Toshiba Embedded NAND Solutions", http://www.toshiba.com/taec/adinfo/embeddednand/, retrieved on Aug. 4, 2009, 2 pages.

Toshiba LBA-NAND Simplifies Integration, http://www.toshiba.com/taec/adinfo/embeddednand/images/LBAblockDiagram.jpg, retrieved on Aug. 4, 2009, 1 page.

Cooke, "Micron e-MMC Embedded Memory Simplifies High Capacity Storage for Mobile and Embedded Solutions," 2007, 7 pages.

Abraham, "Flash Standards for Embedded Systems," Aug. 2008, 22 pages.

Ex Parte Quayle Action for U.S. Appl. No. 11/326,336, dated Jul. 30, 2009, 13 pages.

Office Action for U.S. Appl. No. 11/806,701 dated Jun. 22, 2009, 35 pages.

Office Action for U.S. Appl. No. 11/806,702, dated Jun. 18, 2009, 14 pages.

"Open NAND Flash Interface Specification", Revision 2.1, Jan. 14, 2009, pp. 1-201.

"Samsung Electronics Develops World's First Eight-Die Multi-Chip Package for Multimedia Cell Phones", http://www.samsung.com/us/business/seimconductor/newsView.do?news_id=628.0, Jan. 10, 2005.

Schwaderer, W. et al., "Understanding I/O Subsystems, First Edition", *Adaptec Press*, 1996, pp. ii-iii, 82-87, 176-191.

Serial ATA, "High Speed Serialized AT Attachment", Revision 1.0a, Jan. 7, 2003, 2 pages (title page and p. 144).

Supplemental European Search Report and Opinion for European Patent Application No. 06796108.6, May 7, 2009, 8 pages.

Toshiba TC58NVG1S3BFT00/TC58NVG1S8BFT000 Tentative, Toshiba MOS Digital Integrated Circuit Silicon Gate CMOS, Oct. 30, 2003, pp. 1-37.

Toshiba TC58NVG2D4BFT00/TC58NVG2D9BFT000 Tentative, Toshiba MOS Digital Integrated Circuit Silicon Gate CMOS, Oct. 30, 2003, pp. 1-37.

(56) References Cited

OTHER PUBLICATIONS

U.S. Appl. No. 12/165,141 entitled, "Partial Scrambling to Reduce Correlation," filed Jun. 30, 2008, inventors: Ori Stern, Tal Heller, and Menahem Lasser.

U.S. Appl. No. 12/199,023 entitled, "A Portable Storage Device With an Accelerated Access Speed", filed Aug. 27, 2008, inventors: Judah Gamliel and Donald Ray Bryant-Rich.

U.S. Appl. No. 12/209,697 entitled, "Method for Scrambling Data in which Scrambling Data and Scrambled Data are Stored in Corresponding Non-Volatile Memory Locations," filed Sep. 12, 2008, inventors: Jun Wan, Yupin K. Fong, and Man L. Mui.

U.S. Appl. No. 12/251,820 entitled, "Method for Page- and Block Based Scrambling in Non-Volatile Memory," filed Oct. 15, 2008, inventors: Eran Sharon and Idan Alrod.

U.S. Appl. No. 12/539,394 entitled, "Controller and Method for Interfacing Between a Host Controller in a Host and a Flash Memory Device", filed Aug. 11, 2009, inventors: Eliyahou Harari, Richard R. Heye and Robert D. Selinger.

U.S. Appl. No. 12/539,407 entitled, "Controller and Method for Detecting a Transmission Error Over a NAND Interface Using Error Detection Code", filed Aug. 11, 2009, inventor: Robert D. Selinger.

U.S. Appl. No. 12/539,417 entitled, "NAND Flash Memory Controller Exporting a NAND Interface", filed Aug. 11, 2009, inventors: Eliyahou Harari, Richard R. Heye, Robert D. Selinger and Menahem Lasser.

U.S. Appl. No. 12/539,379 entitled, "Controller and Method for Providing Read Status and Spare Block Management Information in a Flash Memory System," filed Aug. 11, 2009, inventor: Robert D. Selinger.

"USB 2.0 High-Speed Flash Drive Controller, ST72681", Revision Feb. 6, 2009 (previous revisions May 2005-Jan. 2009), pp. 1-34.

Wikipedia, "Southbridge (Computing)", http://en.wikipedia.org/wiki/Southbridge_(computing), Retrieved on Aug. 4, 2009, pp. 1-2.

Extended European Search Report and Opinion for European Patent Application No. 09009022.6-1233, Sep. 21, 2009, 9 pages.

"ONFI Working on Next-Generation NAND Specifications: ONFI 3.0 and EZNAND," 1 page, Jan. 6, 2010.

"Micron NAND Flash Memory: MT29F4G08AAA, MT29F8G08BAA, MT29F8GO8DAA, MT29F16G08FAA," http://download.micron.com/pdf/datasheets/flash/nand/4gb_nand_m40a.pdf, 1 page, 2006.

"Siemens Internal Flash Data Management," 2 pages, Siemens AG 2006.

Examination Report for EP Application No. 09009022.6-1233, 6 pages, May 4, 2010.

Examination Report for EP Application No. 06796108.6-1233, 5 pages, Feb. 17, 2010.

Notice of Ground for Refusal for Korean Patent Application No. 10-2008-7007225, 5 pages, May 11, 2010.

Office Action directed against U.S. Appl. No. 11/806,701, 27 pages, Feb. 25, 2010.

Office Action directed against U.S. Appl. No. 11/806,702, 9 pages, Feb. 25, 2010.

U.S. Appl. No. 12/650,263 entitled, "Method and Controller for Performing a Copy-Back Operation," filed Dec. 30, 2009, inventors: Robert D. Selinger, Gary Lin, Paul Lassa, and Chaoyang Wang.

* cited by examiner

METHOD AND CONTROLLER FOR PERFORMING A SEQUENCE OF COMMANDS

BACKGROUND

NAND flash memory devices are commonly used to store data by a host, such as a personal computer. A host can communicate with a NAND flash memory device using a NAND interface, such as Open NAND Flash Interface (ONFI). Typically, a host sends commands to a NAND flash memory device one-command-at-a-time and waits until the NAND flash memory device completes the first command before sending another command. However, some NAND flash memory devices have a cache register that can store an additional command. In this way, while the NAND flash memory is processing a first command, the host can send a second command to be stored in the cache in the NAND flash memory device. Once the NAND flash memory device completes the first command, it can turn to the second command stored in the cache register. The cache register is designed to store only a single command, and both the command being processed and the cached command are treated as stand-alone commands that are executed one-command-at-a-time. Other NAND flash memory devices have memories that are organized into multiple planes, where each plane has its own cache register. So, a NAND flash memory device having four planes of memory would have four cache registers, one for each plane. However, each cache register is still designed to store only a single command, and both the command being processed and the cached command are treated as stand-alone commands that are executed one-command-at-a-time.

SUMMARY

The present invention is defined by the claims, and nothing in this section should be taken as a limitation on those claims.

By way of introduction, the embodiments described below provide a method and controller for performing a sequence of commands. In one embodiment, a controller receives a command from a host to perform a memory operation in a flash memory device, wherein the command comprises at least one bit that indicates whether the command is a stand-alone command or is part of a sequence of commands. The controller analyzes the at least one bit to determine whether the at least one bit indicates that the command is a stand-alone command or is part of a sequence of commands. If the at least one bit indicates that the command is a stand-alone command, the controller performs the command. If the at least one bit indicates that the command is part of a sequence of commands, the controller performs the command as part of the sequence of commands.

Other embodiments are disclosed, and each of the embodiments can be used alone or together in combination. The embodiments will now be described with reference to the attached drawings.

DETAILED DESCRIPTION OF THE PRESENTLY PREFERRED EMBODIMENTS

Introduction

Some of the following embodiments are directed to a method and controller for performing a sequence of commands. Before turning to these and other embodiments, a general overview of exemplary controller architectures and a discussion of NAND interfaces and NAND interface protocols are provided.

Exemplary Controller Architectures

Figure 1:
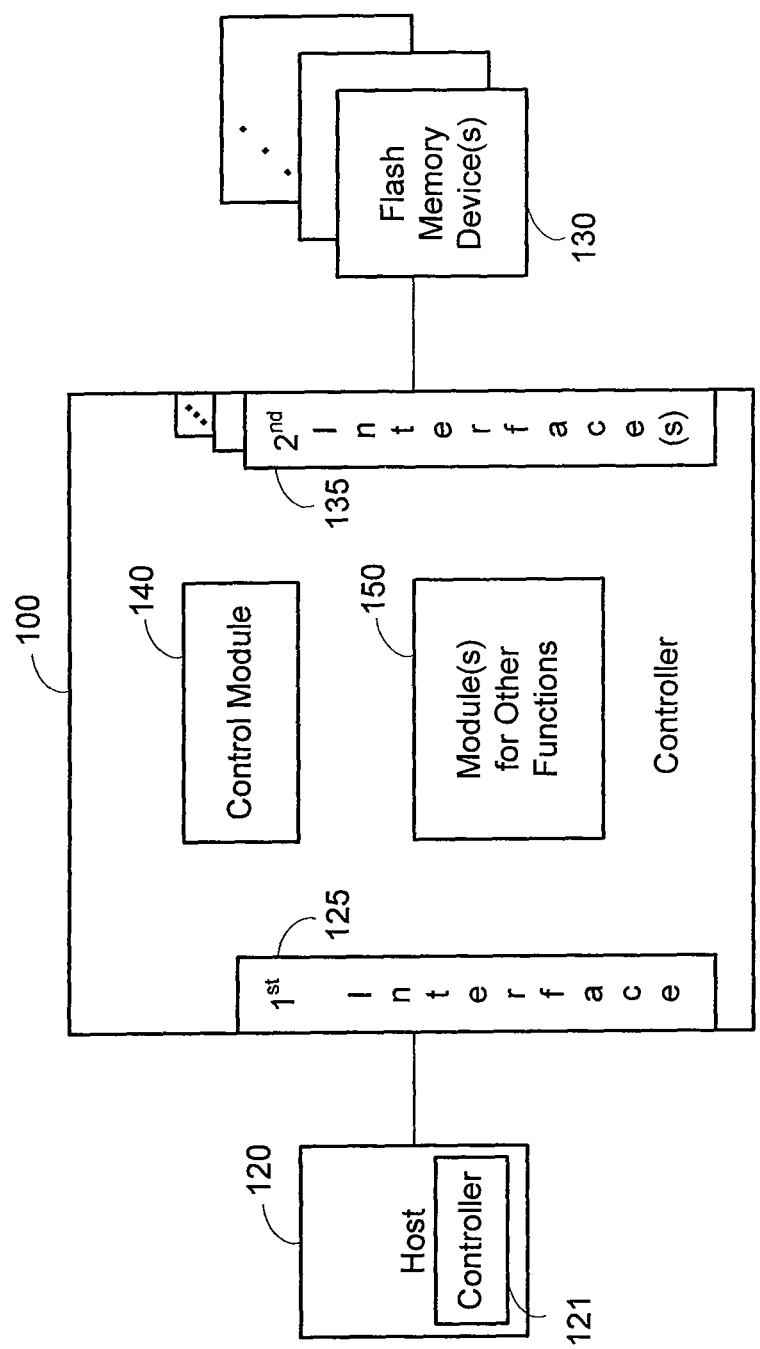
FIG. 1 is a block diagram of a system of an embodiment comprising a controller, a host, and one or more flash memory devices.

Turning now to the drawings, FIG. 1 is a system of an embodiment in which a controller 100 is in communication with a host 120 (having a host controller 121) through a first interface 125 and is in communication with one or more flash memory device(s) 130 through one or more second interface(s) 135. (The number of second interface(s) 135 can match the number of flash memory device(s) 130, or the number of second interface(s) 135 can be greater than or less than the number of flash memory device(s) 130 (e.g., a single second interface 135 can support multiple flash memory device(s)).) As used herein, the phrase "in communication with" means directly in communication with or indirectly in communication with through one or more components, which may or may not be shown or described herein.

A "host" is any entity that is capable of accessing the one or more flash memory device(s) 130 through the controller 100, either directly or indirectly through one or more components named or unnamed herein. A host can take any suitable form, such as, but not limited to, a personal computer, a mobile phone, a game device, a personal digital assistant (PDA), an email/text messaging device, a digital camera, a digital media (e.g., MP3) player, a GPS navigation device, a personal navigation system (PND), a mobile Internet device (MID), and a TV system. Depending on the application, the host 120 can take the form of a hardware device, a software application, or a combination of hardware and software.

"Flash memory device(s)" refer to device(s) containing a plurality of flash memory cells and any necessary control circuitry for storing data within the flash memory cells. In one embodiment, the flash memory cells are NAND memory cells, although other memory technologies, such as passive element arrays, including one-time programmable memory elements and/or rewritable memory elements, can be used. (It should be noted that, in these embodiments, a non-NAND-type flash memory device can still use a NAND interface and/or NAND commands and protocols.) One example of a passive element array is a three-dimensional memory array. As used herein, a three-dimensional memory array refers to a memory array comprising a plurality of layers of memory cells stacked vertically above one another above a single silicon substrate. In this way, a three-dimensional memory array is a monolithic integrated circuit structure, rather than a plurality of integrated circuit devices packaged or die-bonded in close proximity to one another. Although a three-dimensional memory array is preferred, the memory array can instead take the form of a two-dimensional (planar) array. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 6,034,882; 6,185,122; 6,420,215; 6,631,085; and 7,081,377. Also, the flash memory device(s) 130 can be a single memory die or multiple memory dies. Accordingly, the phrase "a flash memory device" used in the claims can refer to only one flash memory device or more than one flash memory device.

As shown in FIG. 1, the controller 100 also comprises a control module 140 for controlling the operation of the controller 100 and performing a memory operation based on a command (e.g., read, write, erase, etc.) and an address received from the host 120. As used herein, a "module" can include hardware, software, firmware, or any combination thereof. Examples of forms that a "module" can take include, but are not limited to, one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. (The following sections provide examples of the various forms a "module" can take.) As shown in FIG. 1, the controller 100 can include one or more additional modules 150 for providing other functionality, including, but not limited to, data scrambling, column replacement, handling write aborts and/or program failures (via safe zones), read scrubbing, wear leveling, bad block and/or spare block management, error correction code (ECC) functionality, error detection code (EDC) functionality, status functionality, encryption functionality, error recovery, and address mapping (e.g., mapping of logical to physical blocks). The following sections provide more details on these functions, as well as additional examples of other functions.

Figure 2A:
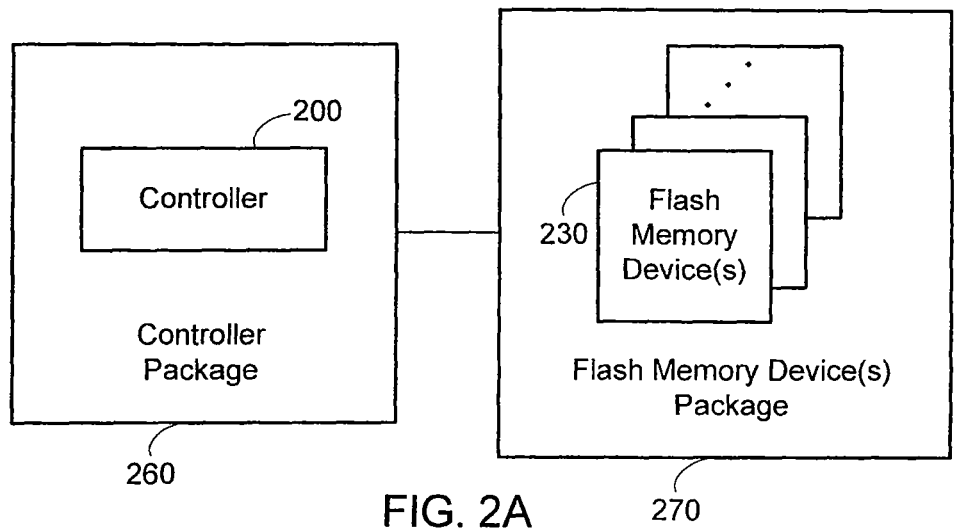
FIGS. 2A, 2B, and 2C are block diagrams illustrating different arrangements of a controller and flash memory device(s) of an embodiment.
Figure 2B:
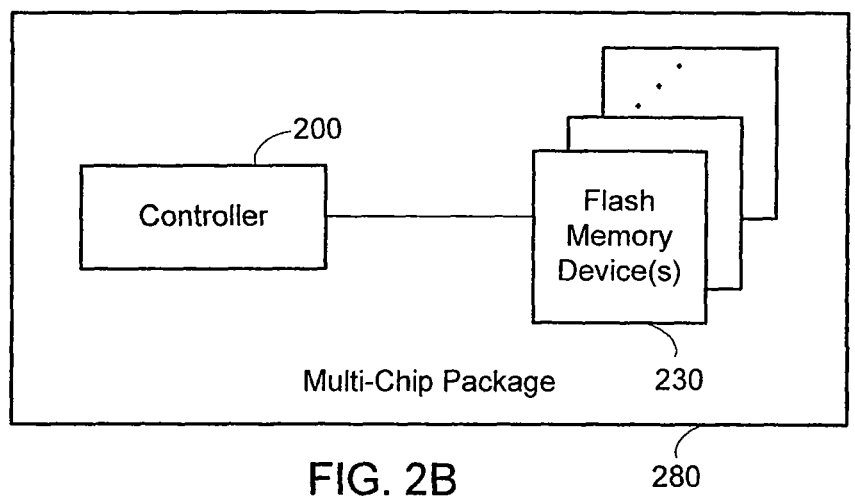
Figure 2C:
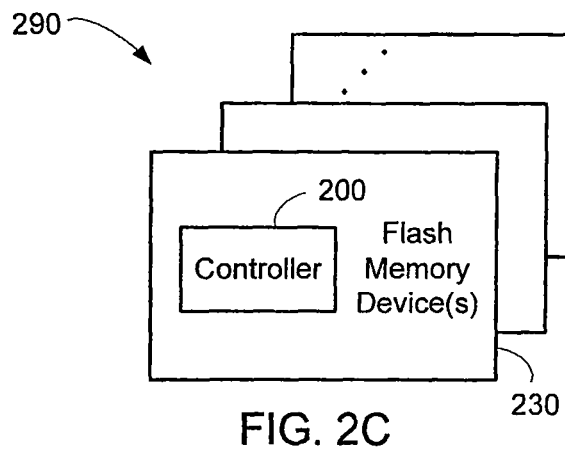

While the controller 100 and flash memory device(s) 130 are shown as two separate boxes in FIG. 1, it should be understood that the controller 100 and flash memory device(s) 130 can be arranged in any suitable manner. FIGS. 2A, 2B, and 2C are block diagrams illustrating different arrangements of the controller and flash memory device(s). In FIG. 2A, the controller 200 and the flash memory device(s) 230 are packaged in different packages 260, 270. In this embodiment, an inter-die interface can interface between the controller 200 and the flash memory device(s) 230. As used herein, an "inter-die interface" (e.g., an inter-die NAND interface) is operative to interface between two distinct units of electronic circuitry residing on distinct dies (e.g., to provide the necessary physical and logical infrastructure for the distinct units of electronic circuitry to communicate with each other, for example, using one or more specific protocols). Thus, the inter-die interface includes the necessary physical elements (e.g., pads, output, input drivers, etc.) for interfacing between the two distinct units of electronic circuitry residing on separate dies.

In FIG. 2B, the controller 200 and the flash memory device(s) 230 both reside within a common multi-chip package 280. In this embodiment, an inter-die interface can interface between the controller 200 and the flash memory device(s) 230 fabricated on two distinct dies that are packaged in the common multi-chip package 280. In FIG. 2C, the controller 200 and the flash memory device(s) 230 are integrated on a same die 290. As another alternative, the controller 200 and/or flash memory device(s) 230 can be fabricated on two distinct dies, where one or both of these dies has no package at all. For example, in many applications, due to a need to conserve space, memory dies are mounted on circuit boards with no packaging at all.

It should be noted that in each of these arrangements, the controller 200 is physically located separately from the host. This allows the controller 200 and flash memory device(s) 230 to be considered a separate circuitry unit, which can be used in a wide variety of hosts.

As noted above with reference to FIG. 1, the controller 100 communicates with the host 120 using a first interface 125 and communicates with the flash memory device(s) 130 using second interface(s) 135. In general, the first and second interfaces 125, 135 can take any suitable form. However, in a presently preferred embodiment, which will be described below in conjunction with FIG. 3, the first and second interfaces 125, 135 are both NAND interfaces that use NAND interface protocols. Before turning to FIG. 3, the following section provides a general discussion of NAND interfaces and NAND interface protocols.

NAND Interfaces and NAND Interface Protocols

A NAND interface protocol is used to coordinate commands and data transfers between a NAND flash device and a host using, for example, data lines and control signals, such as ALE (Address Latch Enable), CLE (Command Latch Enable), and WE# (Write Enable). Even though the term "NAND interface protocol" has not, to date, been formally standardized by a standardization body, the manufacturers of NAND flash devices all follow very similar protocols for supporting the basic subset of NAND flash functionality. This is done so that customers using NAND devices within their electronic products could use NAND devices from any manufacturer without having to tailor their hardware or software for operating with the devices of a specific vendor. It is noted that even NAND vendors that provide extra functionality beyond this basic subset of functionality ensure that the basic functionality is provided in order to provide compatibility with the protocol used by the other vendors, at least to some extent.

A given device (e.g., a controller, a flash memory device, a host, etc.) is said to comprise, include, or have a "NAND interface" if the given device includes elements (e.g., hardware, software, firmware, or any combination thereof) necessary for supporting the NAND interface protocol (e.g., for interacting with another device using a NAND interface protocol). (As used herein, the term "interface(s)" can refer to a single interface or multiple interfaces. Accordingly, the term "interface" in the claims can refer to only one interface or more than one interface.) In this application, the term "NAND Interface protocol" (or "NAND interface" in short) refers to an interface protocol between an initiating device and a responding device that, in general, follows the protocol between a host and a NAND flash device for the basic read, write, and erase operations, even if it is not fully compatible with all timing parameters, not fully compatible with respect to other commands supported by NAND devices, or contains additional commands not supported by NAND devices. One suitable example of a NAND interface protocol is an interface protocol that uses sequences of transferred bytes equivalent in functionality to the sequences of bytes used when interfacing with a Toshiba TC58NVG1S3B NAND device (or a Toshiba TC58NVG2D4B NAND device) for reading (opcode 00H), writing (opcode 80H), and erasing (opcode 60H), and also uses control signals equivalent in functionality to the CLE, ALE, CE, WE, and RE signals of the above NAND device.

It is noted that a NAND interface protocol is not symmetric in that the host—not the flash device—initiates the interaction over a NAND interface. Further, an interface (e.g., a NAND interface or an interface associated with another protocol) of a given device (e.g., a controller) may be a "host-side interface" (e.g., the given device is adapted to interact with a host using the host-side interface), or the interface of the given device may be a "flash memory device-side interface" (e.g., the given device is adapted to interact with a flash memory device using the flash memory device-side interface). The terms "flash memory device-side interface," "flash device-side interface," and "flash-side interface" are used interchangeably herein.

These terms (i.e., "host-side interface" and "flash device-side interface") should not be confused with the terms "host-type interface" and "flash-type interface," which are terminology used herein to differentiate between the two sides of a NAND interface protocol, as this protocol is not symmetric. Furthermore, because it is the host that initiates the interaction, we note that a given device is said to have a "host-type interface" if the device includes the necessary hardware and/or software for implementing the host side of the NAND interface protocol (i.e., for presenting a NAND host and initiating the NAND protocol interaction). Similarly, because the flash device does not initiate the interaction, we note that a given device is said to have a "flash-type interface" if the device includes the necessary hardware and/or software for implementing the flash side of the NAND protocol (i.e., for presenting a NAND flash device).

Typically, "host-type interfaces" (i.e., those which play the role of the host) are "flash device-side interfaces" (i.e., they interact with flash devices or with hardware emulating a flash device) while "flash device-type interfaces" (i.e., those which play the role of the flash device) are typically "host-side interfaces" (i.e., they interact with hosts or with hardware emulating a host).

Because of the complexities of NAND devices, a "NAND controller" can be used for controlling the use of a NAND device in an electronic system. It is possible to operate and use a NAND device directly by a host with no intervening NAND controller; however, such architecture suffers from many disadvantages. First, the host has to individually manipulate each one of the NAND device's control signals (e.g., CLE or ALE), which is cumbersome and time-consuming for the host. Second, the support of error correction code (ECC) puts a burden on the host. For at least these reasons, "no controller" architectures are usually relatively slow and inefficient.

In some conventional controller architectures, a NAND controller interacts with a flash memory device using a NAND interface and interacts with a host using a standard, non-NAND interface, such as USB or SATA. That is, in these conventional controller architectures, the NAND controller does not export a NAND interface to the host. Indeed, this is reasonable to expect, as a host processor that does not have built-in NAND support and requires an external controller for that purpose typically does not have a NAND interface and cannot directly connect to a device exporting a NAND interface and, therefore, has no use of a controller with a host-side NAND interface. On the other hand, a host processor that has built-in NAND support typically also includes a built-in NAND controller and can connect directly to a NAND device, and, therefore, has no need for an external NAND controller.

"NAND Flash Memory Controller Exporting a NAND Interface," U.S. Pat. No. 7,631,245, which is hereby incorporated by reference, discloses a new type of NAND controller, characterized by the fact that the interface it exports to the host side is a NAND interface. In this way, the NAND controller exports to the host the same type of interface that is exported by a standard NAND flash memory device. The controller also preferably has a NAND interface on the flash memory device side as well, where the controller plays the role of a host towards the NAND flash memory device and plays the role of a NAND device towards the host.

Exemplary NAND Flash Memory Controller Exporting a NAND Interface

Figure 3:
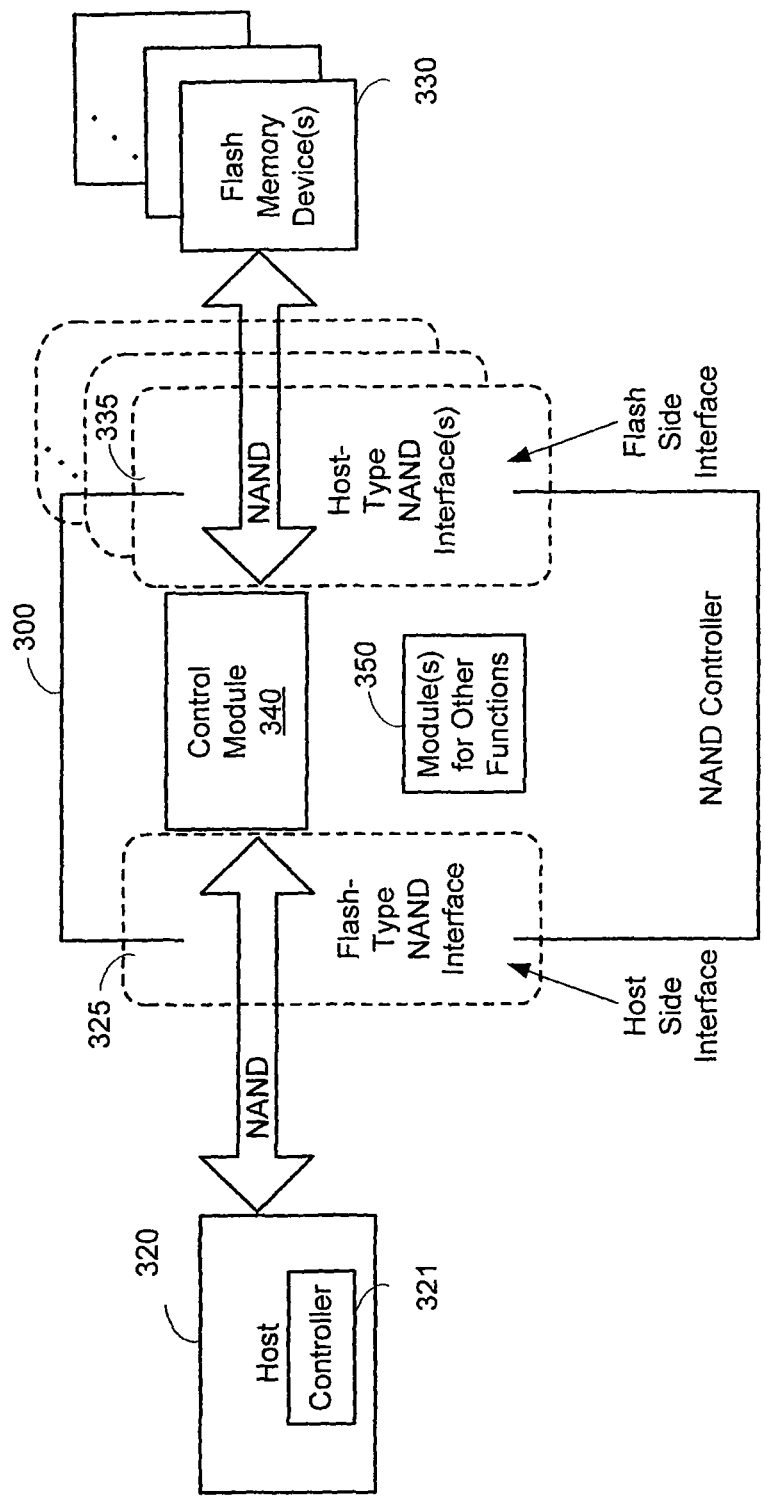
FIG. 3 is a block diagram of an exemplary controller of an embodiment.

Returning to the drawings, FIG. 3 is a block diagram of an exemplary controller 300 of an embodiment. As shown in FIG. 3, the controller 300 includes a control module 340 for controlling the operation of the controller 300 and, optionally, one or more additional modules 350 for providing other functions. Examples of other functions include, but are not limited to, data scrambling, column replacement, handling write aborts and/or program failures (via safe zones), read scrubbing, wear leveling, bad block and/or spare block management, error correction code (ECC) functionality, error detection code (EDC) functionality, status functionality, encryption functionality, error recovery, and address mapping (e.g., mapping of logical to physical blocks). Additional information about these different functional modules and how they are used in exemplary controller architectures is provided later in this document and can be found in U.S. patent application Ser. Nos. 12/539,379; 12/539,394; 12/539,407; and 12/539,417; which are hereby incorporated by reference.

Returning to the drawings, as also shown in FIG. 3, the controller 300 includes one or more flash memory device-side NAND interface(s) 335 for interfacing with one or more NAND flash device(s) 330 (e.g., 1-8 memory dies). Furthermore, it is noted that the flash memory device-side NAND interface 335 is also a host-type NAND interface (i.e., that it is adapted to initiate the interaction over the NAND interface and to present a host to a NAND flash device(s) 330). The controller 300 also includes a host side NAND interface 325 for interfacing to a host 320 (having a host controller 321) that supports a NAND interface protocol. This host side NAND interface 325 is also a flash memory-type NAND interface (e.g., the controller 300 is adapted to present to the host 320 a NAND flash memory storage device). Examples of NAND interfaces include, but are not limited to, Open NAND Flash Interface (ONFI), toggle mode (TM), and a high-performance flash memory interface, such as the one described in U.S. Pat. No. 7,366,029, which is hereby incorporated by reference. The controller 300 may optionally include one or more additional host-side interfaces, for interfacing the controller 300 to hosts using non-NAND interfaces, such as SD, USB, SATA, or MMC interfaces. Also, the interfaces 325, 335 can use the same or different NAND interface protocols.

It should be noted that the controller 300 and flash memory device(s) 330 can be used in any desired system environment. For example, in one implementation, a product manufactured with one or more controller 300/flash memory device(s) 330 units is used in a solid-state drive (SSD). As another example, the controller 300 can be used in OEM designs that use a Southbridge controller to interface to flash memory devices.

There are several advantages of using a NAND flash memory controller that exports a NAND interface to a host. To appreciate these advantages, first consider the realities of current controller architectures. Today, there are two types of NAND interfaces: a "raw" interface and a "managed" interface. With a raw interface, the basic memory is exposed with primitive commands like read, program, and erase, and the external controller is expected to provide memory management functions, such as ECC, defect management, and flash translation. With a managed interface, through some higher level interface, logical items such as sectors/pages/blocks or files are managed, and the controller manages memory management functions.

However, the set of firmware required to "manage" the NAND can be divided into two categories. The first category is generic flash software that mostly manages the host interface, objects (and read/modify/write sequences), and caching. This is referred to as the "host management" layer. The second category is flash-specific management functionality that does, for example, the ECC, data scrambling, and specific error recovery and error prevention techniques like pro-active read scrubbing and copying lower-page blocks to prevent data loss due to write aborts, power failures, and write errors. This is referred to as the "device management" layer.

The first category of software is relatively constant and may be provided by various companies, including OS vendors, chipset and controller vendors, and embedded device vendors. In general, let's assume there are M specific systems/OSes/ASICs that may want to use flash in their designs. The second set is potentially proprietary to individual companies and even specific to certain memory designs and generations. In general, let's assume there are N different memory specific design points. Today, this is an all-or-nothing approach to flash management—either buy raw NAND or managed NAND. This also means that a solution must incorporate one of the M system and host management environments with one of the N memory device management environments. In general, this means that either (1) a flash vendor with the second kind of knowledge must provide all layers of a solution, including ASIC controller and host interface software, and do M different designs for the M different host opportunities, or (2) any independent ASIC and firmware company has little opportunity to customize their solutions to specific memory designs without doing N different designs, or (3) two companies have to work together, potentially exposing valuable trade secrets and IP and/or implement different solutions for each memory design. This can also produce a time-to-market delay if M different host solutions have to be modified to accept any new memory design or vice versa.

By using a NAND flash memory controller that exports a NAND interface to a host, a new logical interface is provided that uses existing physical NAND interfaces and commands, such as legacy asynchronous, ONFI, or TM, to create a new logical interface above raw or physical NAND and below logical or managed NAND, create "virtual" raw NAND memory with no ECC required in the host controller, and disable host ECC (since 0 ECC is required from the host to protect the NAND memory). This new logical interface also can provide, for example, data scrambling, scrubbing, disturbs, safe zone handling, wear leveling, and bad block management (to only expose the good blocks) "beneath" this interface level.

This different logical interface provides several advantages over standard flash interfaces or managed NAND interfaces, including ONFI Block Abstraction (BA) or Toshiba LBA. For example, separation of the memory-specific functions that may vary from memory type and generation (e.g., NAND vs. 3D (or NOR) and 5×nm vs. 4×nm vs. 3×nm) allows for different amounts of ECC, vendor-unique and memory-unique schemes for error prevention and correction schemes, such as handling disturbs and safe zones, and allows vendor-unique algorithms to remain "secret" within the controller and firmware. Additionally, there is greater commonality between technology (and vendors) at this logical interface level, which enables quicker time to market. Further, this allows much closer to 1:1 command operation, meaning improved and more-predictable performance versus managed NAND or other higher level interfaces.

There are additional advantages associated with this controller architecture. For example, it allows for independent development, test, and evolution of memory technology from the host and other parts of the system. It can also allow for easier and faster deployment of next generation memories, since changes to support those memories are more localized. Further, it allows memory manufactures to protect secret algorithms used to manage the raw flash. Also, page management can be integrated with the file system and/or other logical mapping. Thus, combined with standard external interfaces (electrical and command sets), this architecture makes it easier to design in raw flash that is more transparent from generation to generation.

There is at least one other secondary benefit from the use of this architecture—the controller 300 only presents a single electrical load on the external interface and drives the raw flash internal to the MCP. This allows for potentially greater system capacity without increasing the number of flash channels, higher speed external interfaces (since fewer loads), and higher-speed internal interfaces to the raw flash devices (since very tightly-controlled internal design (substrate connection) is possible).

Another advantage associated with the controller of this embodiment is that is can be used to provide a "split bus" architecture through the use of different host and memory buses, potentially at different speeds (i.e., the bus between the host and the controller can be different from the bus between the controller and the flash memory device(s)). (As used herein, a "bus" is an electrical connection of multiple devices (e.g., chips or dies) that have the same interface. For example, a point-to-point connection is a bus between two devices, but most interface standards support having multiple devices connected to the same electrical bus.) This architecture is especially desired in solid-state drives (SSDs) that can potentially have hundreds of flash memory devices. In conventional SSD architectures, the current solution is to package N normal flash memory devices in a multi-chip package (MCP), but this still creates N loads on a bus, creating N times the capacitance and inductance. The more loads on a bus, the slower it operates. For example, one current architecture can support a 80 MHz operation with 1-4 devices but can support only a 40 MHz operation with 8-16 devices. This is the opposite of what is desired—higher speeds if more devices are used. Furthermore, more devices imply the need for greater physical separation between the host and the memory MCPs. For example, if 16 packages were used, they will be spread over a relatively large physical distance (e.g., several inches) in an arbitrary topology (e.g., a bus or star-shaped (or arbitrary stub) topology). This also reduces the potential performance of any electrical interface. So, to obtain, for example, 300 MHz of transfers (ignoring bus widths), either four fast buses or eight slow buses can be used. But, the fast buses could only support four flash memory devices each, or 16 total devices, which is not enough for most SSDs today. If the buses run faster, the number of interface connections (pins and analog interfaces) can be reduced, as well as potentially the amount of registers and logic in the host.

Because the controller 300 in this embodiment splits the interconnection between the host and the raw flash memory device(s) into a separate host side interface and a flash side interface with a buffer in between, the host bus has fewer loads and can run two to four times faster. Further, since the memory bus is internal to the MCP, it can have lower power, higher speed, and lower voltage because of the short distance and finite loads involved. Further, the two buses can run at different frequencies and different widths (e.g., one side could use an 8-bit bus, and the other side can use a 16-bit bus).

While some architectures may insert standard transceivers to decouple these buses, the controller 300 of this embodiment can use buffering and can run these interfaces at different speeds. This allows the controller 300 to also match two different speed buses, for example, a flash side interface bus running at 140 MB/sec and an ONFI bus that runs at either 132 or 166 MB/sec. A conventional bus transceiver design would have to pick the lower of the two buses and run at 132 MB/sec in this example, while the controller 300 of this embodiment can achieve 140 MB/sec by running the ONFI bus at 166 MB/sec and essentially have idle periods. Accordingly, the controller 300 of this embodiment provides higher performance at potentially lower cost and/or lower power and interface flexibility between different products (e.g., different speed and width host and memory buses, fewer loads on the host in a typical system (which enables faster operation and aggregation of the memory bus bandwidth to the host interface), and different interfaces on the host and memory side with interface translation).

As mentioned above, a single controller can also have multiple flash side interface(s) 335 to the flash memory device(s), which also enables further parallelism between raw flash memory devices and transfers into the controller, which allows the flash side interface to run slower (as well as faster) than the host side interface 325. A single controller can also have multiple host side interfaces that may be connected to different host controller interfaces to allow for greater parallelism in accessing the flash memory device(s), to share the controller, or to better match the speed of the flash side interface (which could be faster than the host side interface for the reasons described above).

Another advantage of importing a NAND interface to a host relates to the use of a distributed controller architecture. Today, flash memory devices are typically implemented with a single level of controller. In large solid-state drives (SSDs), there may be tens or even hundreds of flash devices. In high-performance devices, it may be desirable to have parallel operations going on in as many of these flash devices as possible, which may be power constrained. There are interface specs today at 600 MB/sec, and these are still increasing. To reach this level of performance requires very fast controllers, memories, and ECC modules. Today, high performance controllers are built with either one or a small number of ECC modules and one or two microprocessors to handle memory device management. Since some of the functions are very localized to the memory devices themselves, such as ECC, with the controller 300 of this embodiment, a two-tiered network of devices can be utilized. Specifically, the host 320 can manage the host interface and high-level mapping of logical contents, and one or more controllers 300 can manage one or more raw NAND flash memory devices to provide local management of memory device functions (e.g., ECC) and parallelism in the execution of these functions due to parallel execution of the controller 300 and the host 320 and parallel execution of multiple controllers 300 handling different operations in parallel on different memories 320. In contrast to conventional controllers in SSDs, which perform memory device management functions in one place, by splitting these functions into two layers, this architecture can take advantage of parallel performance in two ways (e.g., between host and slave, and between many slaves). This enables higher total performance levels (e.g., 600 MB/sec) without having to design a single ECC module or microprocessor that can handle that rate.

Yet another advantage of this architecture is that a higher-level abstraction of the raw memory can be developed, such that system developers do not need to know about error recovery or the low-level details of the memory, such as ECC and data scrambling, since the controller 300 can be used to perform those functions in addition to handling memory-specific functions such as read, erase, and program disturbs, and safe zones. This level of support is referred to herein as "corrected" flash," which is logically in between raw flash and managed NAND. On the other hand, this architecture is not fully managed memory in the sense of page or block management at a logical level and may require the host to provide for logical-to-physical mapping of pages and blocks. However, the controller 300 can still present some flash memory management restrictions to the host and its firmware, such as: only full pages can be programmed, pages must be written in order within a block, and pages can only be written once before the entire block must be erased. Wear leveling of physical blocks to ensure that they are used approximately evenly can also be performed by the controller 300; however, the host 320 can be responsible for providing this function. Also, the controller 300 preferably presents the host 320 with full page read and write operations into pages and blocks of NAND. The characteristics of logical page size and block size will likely be the same as the underlying NAND (unless partial page operations are supported). The majority of the spare area in each physical page in the raw NAND will be used by the controller 300 for ECC and its metadata. The controller 300 can provide for a smaller number of spare bytes that the using system can utilize for metadata management.

Embodiments Relating to Performing a Sequence of Commands

As described in the background section above, when a host communicates with a NAND flash memory device using a NAND interface, such as Open NAND Flash Interface (ONFI), the host typically sends commands to a NAND flash memory device one-command-at-a-time and waits until the NAND flash memory device completes the first command before sending another command. Even when the NAND flash memory device has a cache register that can store an additional command, both the command being processed and the cached command are treated as stand-alone commands that are executed one-command-at-a-time. With the following embodiments, a controller between the host and one or more NAND flash memory devices can be used to group a sequence of commands together and process them together, even though the commands are received from the host one-command-at-a-time. This allows the controller to perform multi-plane, pipelined, and queued commands.

While any suitable architecture can be used, these embodiments will be described in conjunction with the architecture shown in FIG. 3. In this architecture, the host 320 is aware of the logical operations it wants performed and uses a standard NAND interface to issue standard commands to a "smarter" controller 300. The controller 300 can then, when appropriate, group a sequence of commands together and process them as a group, even though the commands are received from the host 320 one-command-at-a-time. However, it should be noted that the use of NAND interfaces and other details from FIG. 3 and the corresponding discussion should not be read into the claims unless explicitly recited therein.

Figure 4:
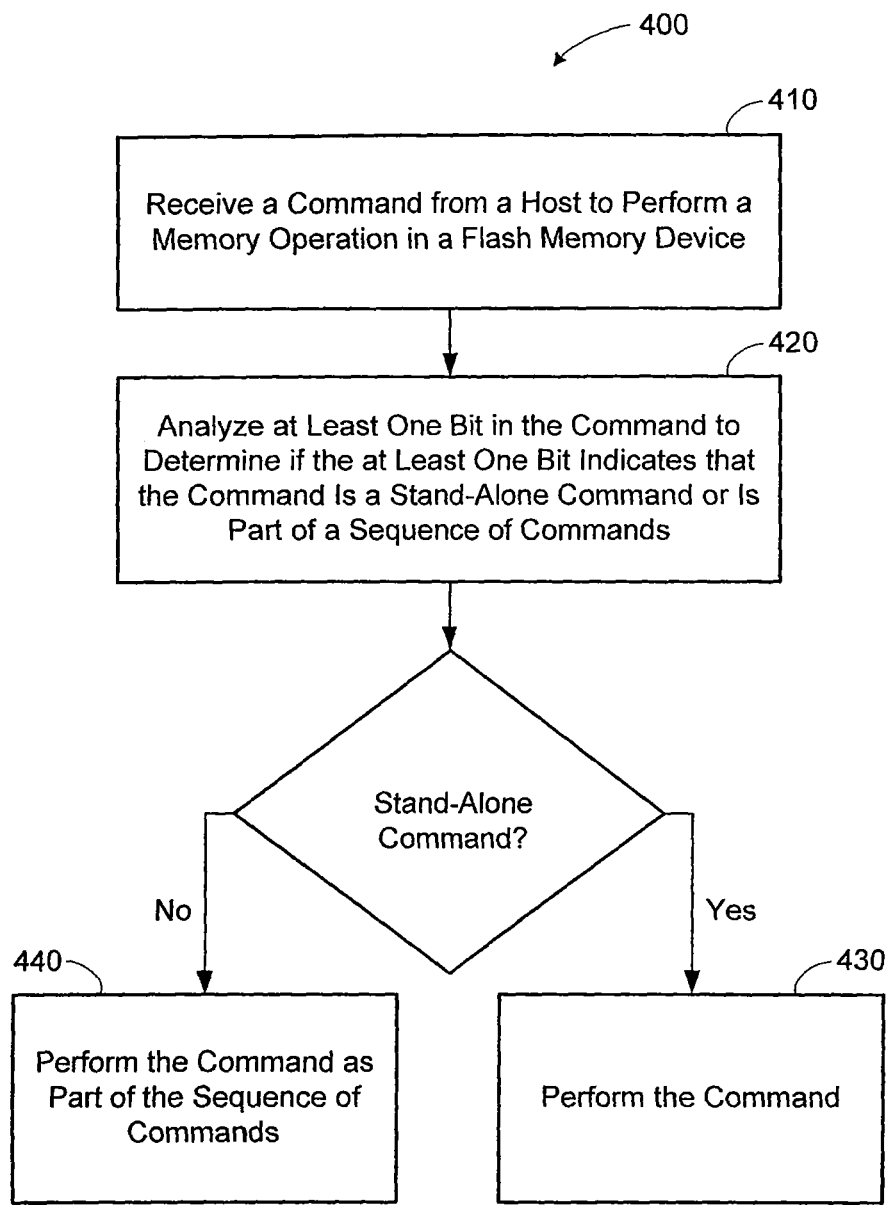
FIG. 4 is a flow chart of a method for performing a sequence of commands of an embodiment.

In this embodiment, the control module 340 in FIG. 3 takes the form of circuitry designed to operate to perform the acts shown in FIG. 4. As used herein, "circuitry" can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of such components are discussed below.

Turning now to the flowchart 400 in FIG. 4, the controller 300 receives a command from the host 320 to perform a memory operation in the flash memory device 330 (act 410). In this embodiment, the command comprises at least one bit that indicates whether the command is a stand-alone command or is part of a sequence of commands. The at least one bit can be any number of bits and, in one embodiment, is a single bit that is one of a plurality of reserved address bits in the command. In this particular example, the at least one bit is the most significant address bit and will be referred to herein as a "continuation bit" or "chaining bit" (or "CB").

When the command is received, the controller 300 analyzes the CB to determine whether it indicates that the command is a stand-alone command or is part of a sequence of commands (act 420). If the CB indicates that the command is a stand-alone command (e.g., CB=0), the controller 300 performs the command (act 430). However, if the CB indicates that the command is part of a sequence of commands (e.g., CB=1), the controller 320 performs the command as part of the sequence of commands (act 440). That is, the controller 300 would translate the command as a super-command set where it can be a representation of, for example, (1) a command in a group of commands targeted to all planes, (2) a command in a group of commands that should be treated together as an atomic command sequence, (3) or a command that is part of a sequential group of commands with incremental addresses. Thus, in this example, a string of commands with CB=1 would be treated by the controller 300 as part of a sequence of commands to be processed together, with the last command in the group having CB=0.

This capability can be exposed in a vendor-unique portion of a parameter page, which can indicate that the device supports CB processing and which commands or types of commands can be executed with the CB set. The parameter page can also indicate a maximum queue depth (e.g., equal to the number of planes or greater) and whether different operations (e.g., writes and erases) can be combined. It may also be desirable to have the host firmware indicate whether the CB mode is to be used, which can be done via a Set Feature command. So, the host 320 can generate multiple standard IO commands, each with the CB set, to a NAND device driver. The NAND device driver would then interact with NAND bus master hardware to execute each CB command as a normal command. Accordingly, these embodiments can be used to create overlapped writes (or other commands) to multiple planes (or even multiple dies) in a single logical unit (LUN) without defining a new command.

There are several advantages associated with these embodiments. For example, providing a controller that can perform a sequence of commands can help maximize performance of a flash die by executing two or more overlapped operations (e.g., reads, programs (writes), or erases), frequently to different planes. Consider the situation in which the host wants to send ten read commands to the controller. Without these embodiments, the host would need to wait for one read command to be completed before sending the next read command. This waiting time can be long and degrade performance. With these embodiments, the host 320 can send the entire sequence of the read commands back-to-back without waiting for any of these commands to be completed, and the controller 300 would internally deal with all ten read commands. This provides improved performance over systems in which the host needs to wait for a response from the controller before sending an additional command. That is, in this embodiment, the controller 300 would send a response back to the host 320 after the entire sequence of commands have been received rather than after each command has been received.

There are several different operation types that can be used in these embodiments, and they can generally fall into two categories: (1) commands that transfer any data before status or (2) commands that transfer data after status. A program operation is an example of the first category, while reads are examples of the second. An erase command does not perform a data transfer and can be considered another example of the first category. For operations in the first category, the controller 300 can return a status after each program part. Consider, for example, a single program command sequence can consist of (1) command, (2) address, (3) data transfer, and (4) device busy until status returned. The controller 300 can quickly return a "good" status in step 4 (unless something was wrong) and then proceed to accept other commands and process them similarly. When the last command is received with CB=0, the controller 300 can complete the operation of the set of commands and then return status for the entire sequence. A non-zero status can be further defined to require reading other feature bytes or reading a special address to indicate which operations failed (as this would not be a normal event, fast processing for this may not be needed). A sequence of erase commands can also be sent as above, with step 3 eliminated.

These embodiments also provide an advantage over prior NAND flash memory device that use a cache register, as those prior devices only store a single command, and both the command being processed and the cached command are treated as stand-alone commands that are executed one-command-at-a-time. Further, NAND flash memory devices that have a cache register typically can only cache write, read, and erase commands, whereas these embodiments can be used to store any type of command, as the CB bit instructs the controller 300 that an incoming command is a pipelined command.

Figure 5:
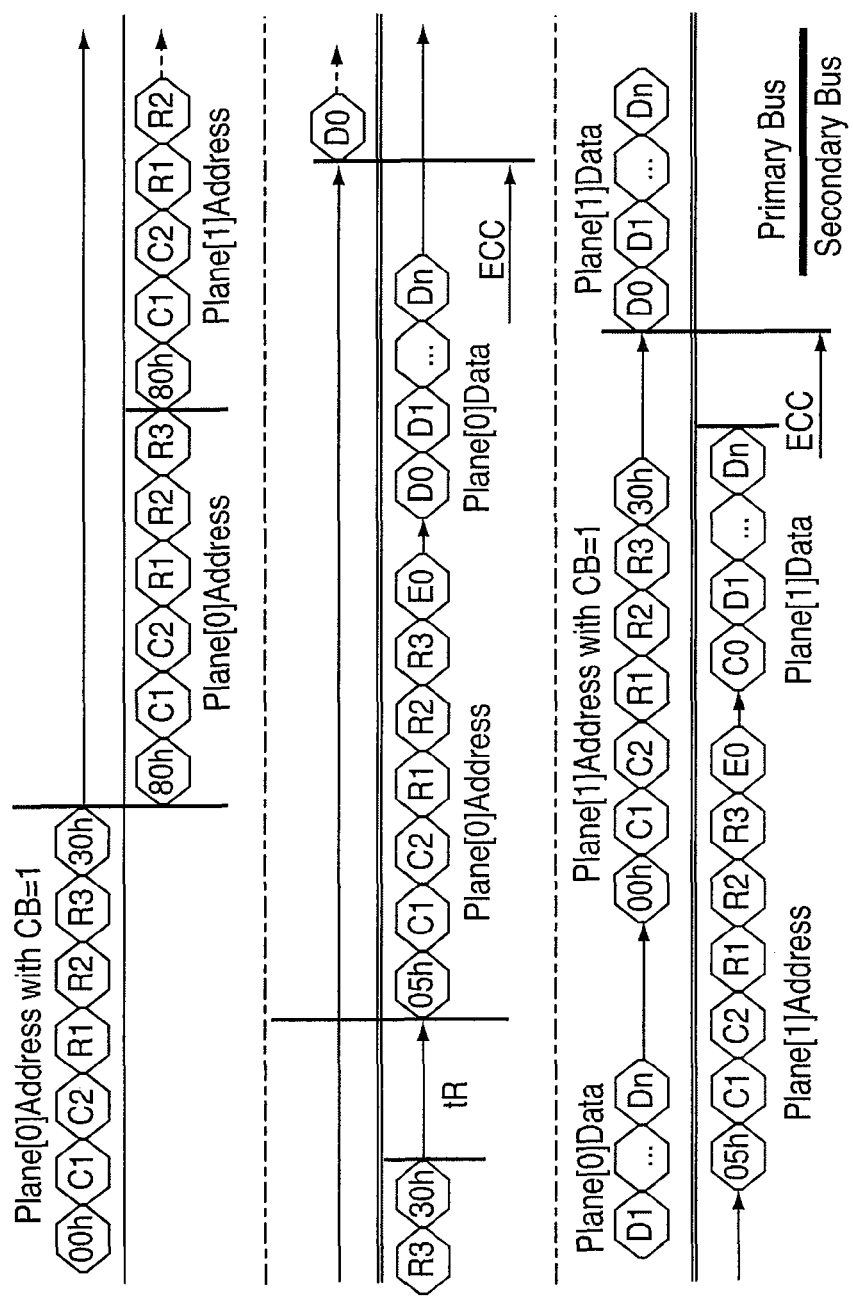
FIG. 5 is a timing diagram of a multi-plane read operation of an embodiment.
Figure 6:
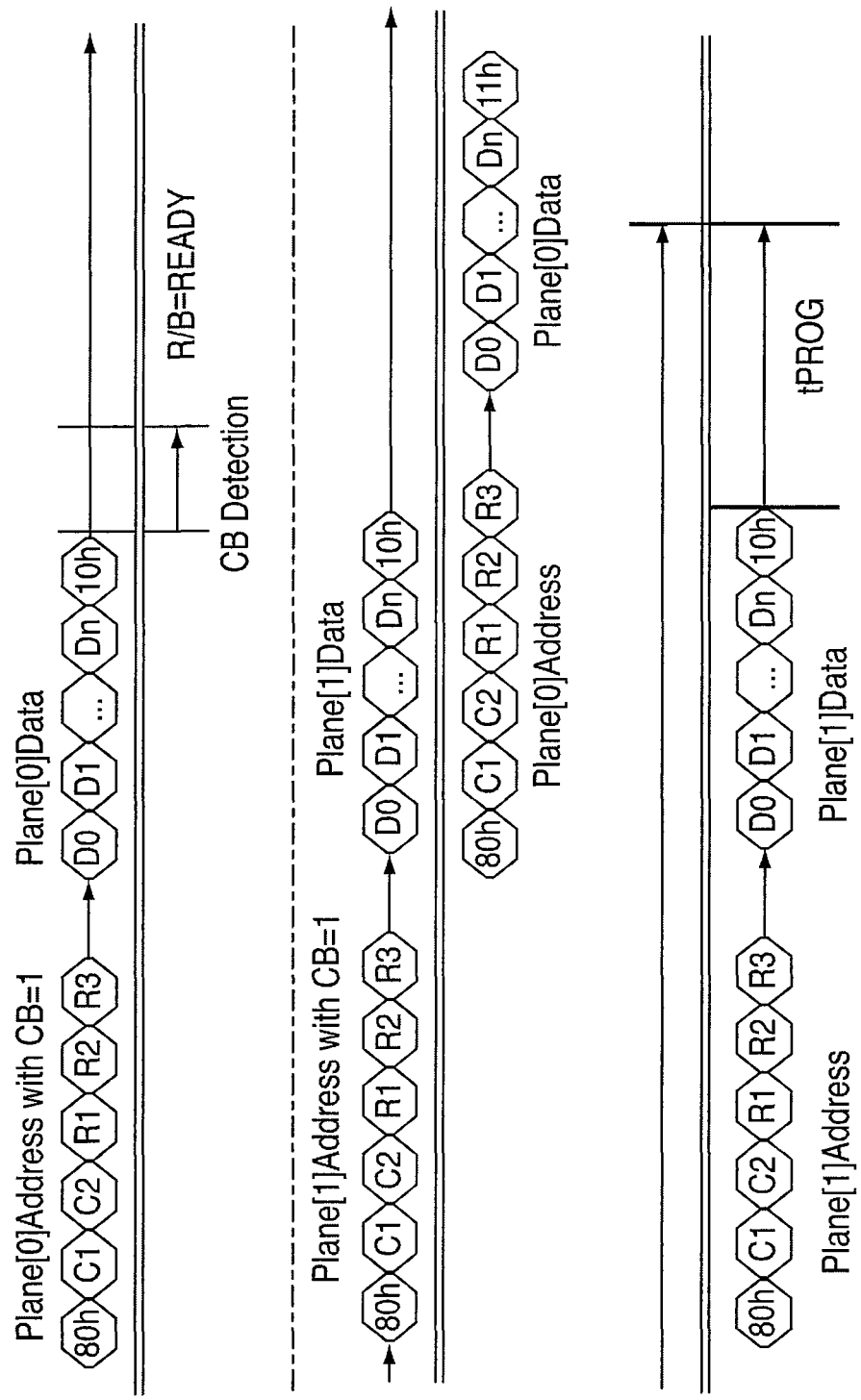
FIG. 6 is a timing diagram of a multi-plane program operation of an embodiment.
Figure 7:
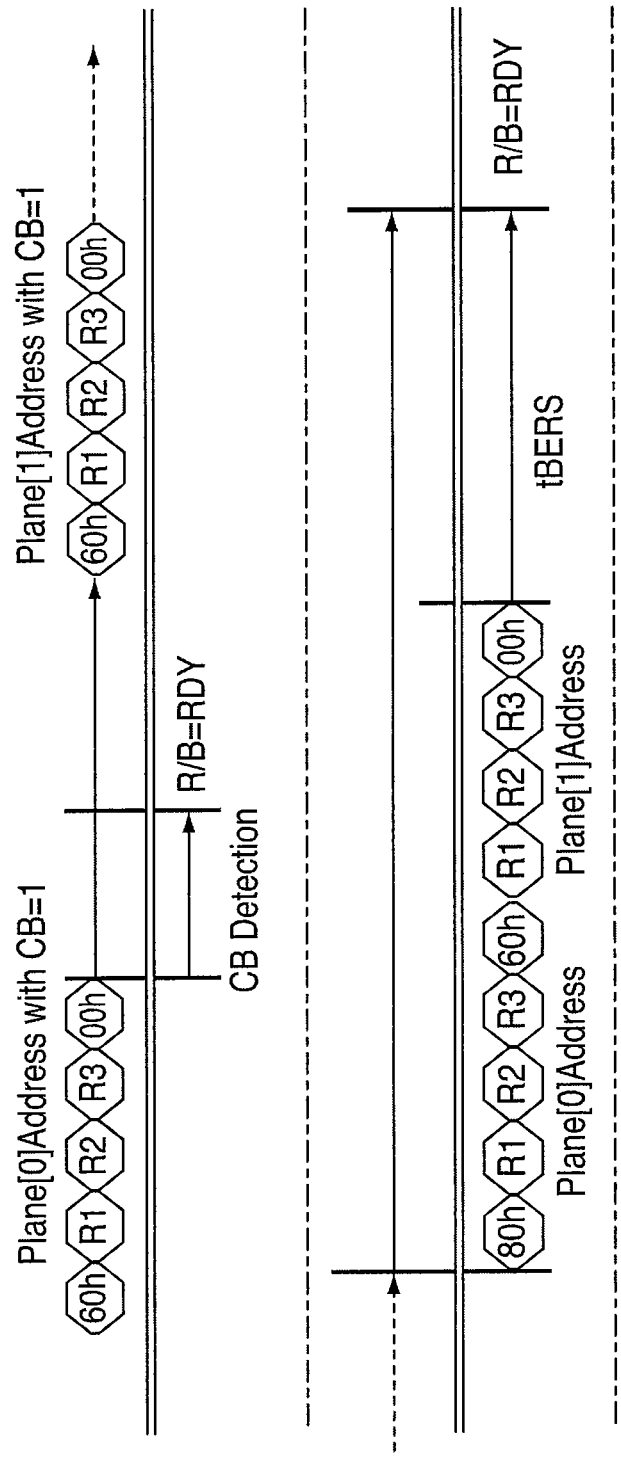
FIG. 7 is a timing diagram of a multi-plane block erase operation of an embodiment.

As mentioned above, these embodiments can be used to allow command queuing and/or a transaction mechanism, where multiple commands can be sent and either staged for execution and/or executed as a group. For example, if the flash memory device 330 is organized into a plurality of planes, the controller 300 can perform each command in the sequence of commands in a different one of the plurality of planes. As another example, if the sequence of commands is an atomic command sequence, the controller 300 can perform the sequence of commands together as a group. As yet another example, if the sequence of commands contains incremental addresses, the controller 300 can perform these commands by pre-fetching information from the incremental addresses. A parameter page or Set Feature parameter can indicate whether incremental addresses refer to incremental addresses in the same plane or to the same address in different planes. FIGS. 5-7 provide timing diagrams that will illustrate exemplary operations of these embodiments.

Turning first to FIG. 5, is a timing diagram of a multi-plane read operation of an embodiment. In this example, it is assumed that the host 320 will have identical page addresses for all planes in the flash memory device 330. As shown in this timing diagram, the host 320 issues a read command (00) Addr0(30)—referred to as PCMD[A]—with the CB bit set to 1. The controller 300 receives the command and detects the CB bit in the address field. In this example, "incremental addresses" refer to the same address in different planes. Thus, multi-page read commands in this example are issued by the controller 320 to the selected flash memory device die, with the same block and page addresses to all planes. After tR (Page read time), all pages requested are ready, and the corresponding page of data for the PCMD[A] is transferred from the flash memory device 330 to the controller 300. The controller 300 can perform optional data management functions, such as de-scrambling and ECC correction. While the management function is executing, the controller 300 may initiate data transfer for other planes' ready data to the same block and page address, if there is no resource restriction in the controller 300.

The host 320 will discover the command PCMD[A] is ready via the ready/busy signal or by polling the status or extended status register and initiate data transfer from the controller 300. After that, the host 320 issues the next Read command—(00)Addr1(30)—referred as PCMD[B]—to read the same block/page to the next plane, with the CB bit set as well, shown as "Plane[1] Address with CB=1" in FIG. 5. The controller 300 maintains a counter to distinguish if the CB command is the first command that need to perform multi-page read commands to the selected flash memory device die. If the CB command is a continuation command of the set, no new page read is issued to the flash memory die. If the request data has been transferred to the controller 300, the status of PCMD[B] shall be marked as ready. Otherwise, the controller 300 may need to initiate the data transferred from the die's register, optionally perform de-scrambling and ECC correction, and mark the status for PCMD[B] as ready. For these following CB command, the page read time tR is saved, and hence, plane interleaved performance is achieved.

FIG. 6 is a timing diagram of a multi-plane program operation of an embodiment. In this embodiment, the host 320 issues a page program command ((80) Addr Data-in (10))—referred as PCMD[A]—with CB=1 to start the multi-plane program. The controller 300 receives the command and detects the CB bit in the address field. The controller 300 can have pre-defined logic to determine if the command is the last command of the multi-plane operation. If the command is not the last command, the controller 300 can mark the LUN Status to be ready. In the mean time, if possible, the controller 300 can issue the multi-page program command to the die on the secondary bus with (80)Adddr Data-in(11). The host 320 can discover that the LUN is ready, and it can issue the next page program command ((80) Addr Data-in (11))—referred as PCMD[B]—with CB=1 and addressed to the next plane, shown as "Plane[1] Address with CB=1" in FIG. 6. The host 320 can check that the LUN is ready and repeat PCMD[B] until the last plane. For the last plane, the host 320 can issue the next page program command ((80) Addr data-in (10))—referred as PCMD[C]—with CB=0 and addressed to the last plane. The controller 300 may discover the PCMD[C] is the last command of the set. If so, the controller 300 can issue command (80) Addr Data-in (10), which starts the tPROG for all planes after the data-in is completed. The plane interleaved performance is thus achieved. In this embodiment, there is no additional address restriction for multi-plane program since addresses are received before the die command can be issued.

Referring now to FIG. 7, FIG. 7 is a timing diagram of a multi-plane block erase operation of an embodiment. In operation, the host 320 would issue a Block Erase command ((60) BAddr (D0))—referred to as PCMD[A]—with CB set=1 to start a multi-plane block erase. The controller 300 receives the command and detects the CB bit in the address field. The controller 300 can have pre-defined logic to determine if the command is the last command of the multi-plane operation. If the command is not the last command, the controller 300 can mark the LUN status to ready. When the host 320 discovers that the LUN is ready, it is able to issue the next block erase command ((60) BAddr (D0))—referred as PCMD[B]—with CB set to the next plane. The controller 300 may discover the PCMD[B] is the last command of the set. If so, the controller 300 issues a multi-block erase command to performance block erase on all planes in a single tBERS period, so to achieve plane interleaved operation. In this embodiment, there is no additional address restriction for the multi-plane block erase operation, since addresses are received before the die command can be issued.

Exemplary NAND Flash Memory Controller Embodiment

This section discusses an exemplary controller architecture and provides more details on some of the various functional modules discussed above. As noted above, a "module" can be implemented in any suitable manner, such as with hardware, software/firmware, or a combination thereof, and the functionality of a "module" can be performed by a single component or distributed among several components in the controller.

Figure 8A:
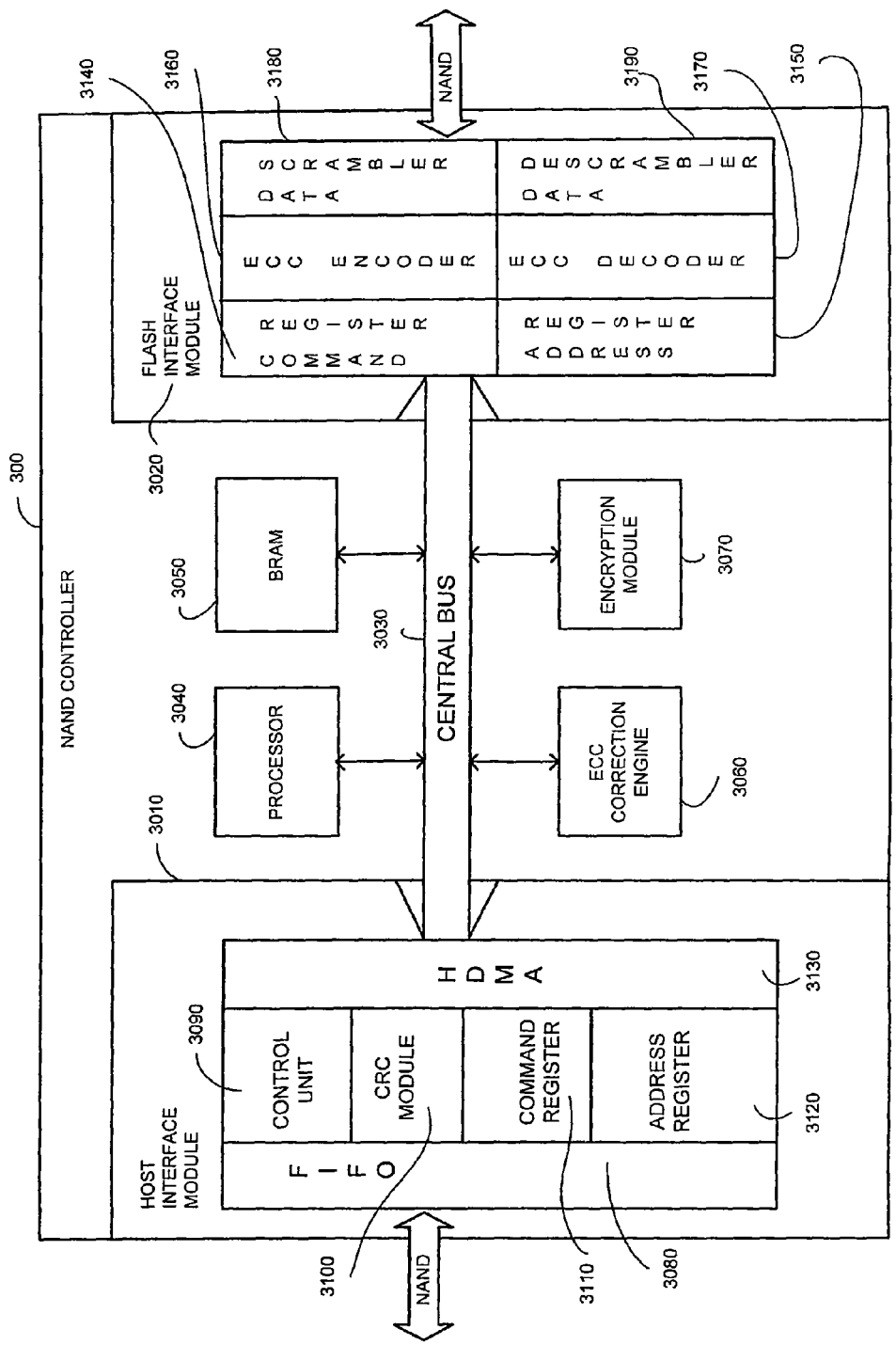
FIGS. 8A, 8B, 8C, and 8D are block diagrams of exemplary controllers of an embodiment.

Returning now to the drawings, FIG. 8A is a diagram of a presently preferred implementation of the NAND controller 300 of FIG. 3. It should be understood that any of the components shown in these drawings can be implemented as hardware, software/firmware, or a combination thereof. In this implementation, the first NAND Interface 325 in FIG. 3 is implemented by the Host Interface Module ("HIM") 3010. The HIM 3010 is a collection of logic that supports the "host side interface" as a "flash device-type interface." The HIM 3010 comprises a first-in-first-out ("FIFO") module 3080, a control unit 3090, a cyclic redundancy check ("CRC") module 3100 (although another type of error detection code ("EDC") module can be used), a command register 3110, an address register 3120, and a host direct memory access ("HDMA") unit 3130. In this embodiment, the HIM 3010 takes the form of an ONFI HIM. As will be discussed in more detail below, some HIMs receive a high-level request from a host controller for a relatively-large amount of data that spans several pages, and the NAND controller determines what actions are needed to satisfy the request. In contrast, an ONFI HIM receives several smaller-sized requests (e.g., for individual pages) from a host controller, so the ONFI HIM is required to simultaneously handle multiple (e.g., eight) read and write requests.

Returning to FIG. 8A, the second NAND Interface 335 of FIG. 3 is implemented here by a Flash Interface Module ("FIM") 3020. In a current embodiment, the FIM 3020 is implemented as a collection of logic and a low-level programmable sequencer that creates the "device side interface" as a "host-type interface." In this embodiment, the FIM 3020 comprises a command register 3140, an address register 3150, an ECC encode module 3160, an ECC decode module 3170, a data scrambler 3180, and a data descrambler 3190.

Internal to the NAND controller 300 is a processor 3040, which has local ROM, code RAM, and data RAM. A central bus 3030 connects the processor 3040, the HIM 3010, the FIM 3020, and the other modules described below and is used to transfer data between the different modules shown. This bi-directional bus 3030 may be either an electrical bus with actual connections to each internal component or an Advanced High-Speed Bus ("AHB") used in conjunction with an ARC microprocessor, which logically connects the various modules using an interconnect matrix. The central bus 3030 can transmits data, control signals, or both. The NAND controller 300 also comprises a buffer RAM ("BRAM") 3050 that is used to temporarily store pages of data that are either being read or written, and an ECC correction engine 3060 for correcting errors. The NAND controller 300 further comprises an encryption module 3070 for performing encryption/decryption functions.

The NAND controller 300 can further comprise a column replacement module, which is implemented here by either the FIM sequencer, firmware in the processor 3040, or preferably in a small amount of logic and a table located in the FIM 3020. The column replacement module allows the flash memory device(s) 330 (FIG. 3) to contain information on bad column locations. The bad column address information is contained in the flash memory device(s) 330 and is scanned by firmware prior to any read or write operation. After firmware scans the flash memory device(s) 330, it builds a bad column address table with the bad column location to be used by the column replacement module. On flash write operations, the column replacement module inserts the data (0xFFFF) for the address that is detected in a bad column address table. On flash read operations, data from the bad column address will be discarded.

With the components of the NAND controller 300 now generally described, exemplary write and read operations of the NAND controller 300 will now be presented. Turning first to a write operation, the FIFO 3080 in the HIM 3010 acts as a buffer for an incoming write command, address, and data from a host controller and synchronizes those elements to the system card domain. The CRC module 3100 checks the incoming information to determine if any transmission errors are present. (The CRC module 3100 is an example of the EDC module discussed above.) The CRC module generates or checks an error detection code to check for transmission errors as part of an end-to-end data protection scheme. If no errors are detected, the control unit 3090 decodes the command received from the FIFO 3080 and stores it in the command register 3110, and also stores the address in the address register 3120. The data received from the host controller is sent through the HDMA AHB interface 3130 to the BRAM 3050 via the central bus 3030. The control unit 3090 sends an interrupt to the processor 3040, in response to which the processor 3040 reads the command from the command register 3080 and the address register 3120 and, based on the command, sets up the data path in the FIM 3020 and stores the command in the FIM's command register 3140. The processor 3040 also translates the address from the NAND interface 325 into an internal NAND address and stores it in the FIM's address register 3150. If logical-to-physical address conversion is to be performed, the processor 3040 can use a mapping table to create the correct physical address. The processor 3040 can also perform one or more additional functions described below. The processor 3040 then sets up a data transfer from the BRAM 3050 to the FIM 3020.

The FIM 3020 takes the value from the address register 3150 and formats it in accordance with the standard of the NAND interface 335. The data stored in the BRAM 3050 is sent to the encryption module 3070 for encryption and is then sent through the data scrambler 3180. The data scrambler 3180 scrambles the data and outputs the data to the FIM's ECC encoder 3160, which generates the ECC parity bits to be stored with the data. The data and ECC bits are then transferred over the second NAND interface with the write command to the flash memory device(s) for storage. As an example of an additional function that may occur during writes, if protection for write aborts or program failures is enabled and if the write request is to an upper page address, the processor 3040 can send a read command to the flash memory device(s) over the second NAND interface for the corresponding lower page and then send a program command to have it copied into a safe zone (a spare scratchpad area) by writing it back to another location in the flash memory device(s) 330. If an error occurs in writing the upper page, the lower page can still be read back from the safe zone and the error corrected. (This is an example of the module discussed above for handling write aborts and/or program failures via safe zones.)

Turning now to a read operation, the HIM 3010 receives a read command from a host controller, and the processor 3040 reads the command and logical address. If logical-to-physical address conversion is to be performed, the firmware in the processor 3040 could use a mapping table to create the correct physical address. (This is an example of the address mapping module discussed above.) The firmware then sends the physical address over the second NAND interface 335 to the flash memory device(s) 330. After the read access, the data is transferred over the NAND interface, decoded and used to generate the syndrome data for error correction, descrambled by the data descrambler 3190, and then sent over the central bus 3030 to the BRAM 3050. The ECC correction engine 3060 is used to correct any errors that can be corrected using the ECC on the data that is stored in the BRAM 3050. Since the ECC may be computed and stored in portions of a physical page, the processor 3040 can be interrupted as each portion of the page is received or corrected, or once when all of the data is transferred. The encryption module 3070 then performs a decryption operation on the data. The timing described above is flexible since the first NAND interface 325 and the second NAND interface 335 may operate at different speeds, and the firmware can transfer the data using either store-and-forward techniques or speed-match buffering. When the data is sent back to the host controller, it is sent through the HIM 3010, and the transmission CRC is sent back to the host over the first NAND interface 325 to check for transmission error.

As mentioned above, in addition to handling commands sent from the host controller, the processor 3040 may perform one or more additional functions asynchronously or independent of any specific command sent by the host. For example, if the ECC correction engine 3060 detects a correctable soft error, the ECC correction engine 3060 can correct the soft error and also interrupt the processor 3040 to log the page location so that the corresponding block could be read scrubbed at a later point in time. Other exemplary background tasks that can be performed by the processor 3040 are wear leveling and mapping of bad blocks and spare blocks, as described below.

Figure 8B:
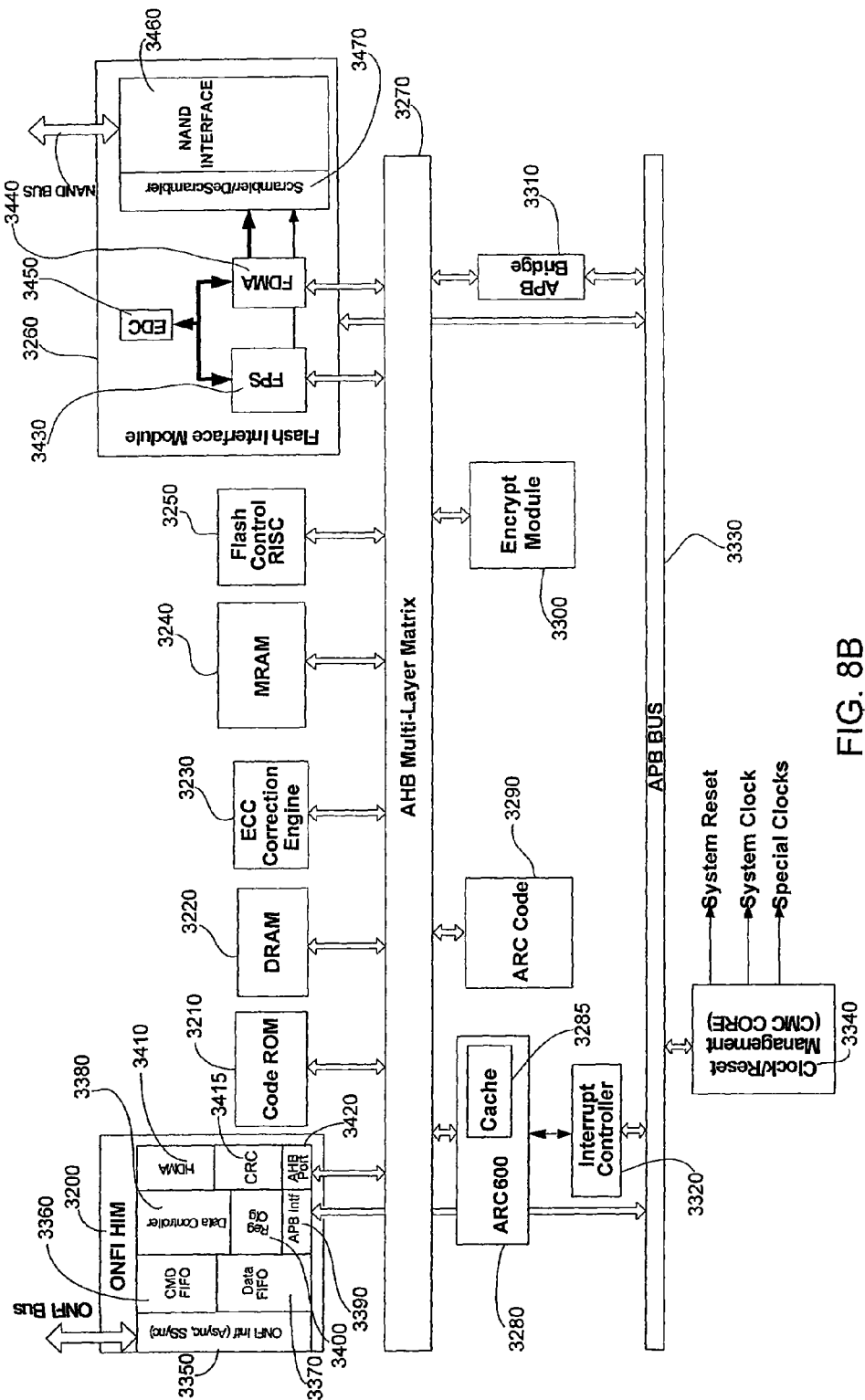

Turning again to the drawings, FIG. 8B is a block diagram showing a more detailed view of a NAND controller of an embodiment. As with the controller shown in FIG. 8A, the controller in this embodiment contains an ONFI HIM 3200 and a FIM 3260 that communicate through a central bus (here, an Advanced Microcontroller Bus Architecture ("AMBA") High-performance Bus ("AHB") multi-layer matrix bus 3270 for the data path and an advanced peripheral bus ("APB") 3330 for the command path). The ONFI HIM 3200 and the FIM 3260 can be associated with any of the processors. For example, the ONFI HIM 3200 can be associated with an ARC600 microprocessor 3280 (with a built-in cache 3285) that runs ARC code stored in a MRAM 3290. In general, the ARC600 3280 is used to service interrupts from the ONFI HIM 3200 and manages the data path setup and transfers information to the flash control RISC 3250. The flash control RISC 3250 is the microprocessor that can be used with the FIM 3260 and, in general, handles the function of setting up the FIM 3260 by generating micro-control codes to various components in the FIM 3260. More particularly, the flash control RISC 3250 sets up the flash direct memory access ("FDMA") module 3440 in the FIM 3260, which communicates with the AHB bus 3270 and generates the AHB bus protocol commands to read data from the DRAM 3220. The flash control RISC 3250 also sets up the EDC module 3450, which contains the ECC encoder and decoder. The MRAM 3240 stores code used to run the flash control RISC 3250.

The NAND controller in this embodiment also contains a ROM 3210 that stores instruction code to get the controller running upon boot-up. Additional components of the NAND controller include a DRAM 3220, an ECC correction engine 3230, an encrypt module 3300, an APB bridge 3310, an interrupt controller 3320, and a clock/reset management module 3340.

The encryption module 3300 enciphers and deciphers 128 bit blocks of data using either a 128, 192, or 256 bit key according to the Advanced Encryption Standard (AES). For write operations, after data is received from the host and sent to the BRAM 3050 (FIG. 8A) by the ONFI HIM, the ARC600 processor 3280 creates a control block with defined parameters of the encipher operations. The encryption module 3300 then performs the encipher operations and stores the resulting data to BRAM 3050 and interrupts the ARC600 processor 3280 to indicate that the data is ready. For read operations, after the ECC engine completes error correction in the BRAM 3050, the ARC600 processor 3280 creates a control block with defined parameters of the decipher operations. The encryption module 3300 then performs the decipher operations and stores the resulting data to the BRAM 3050 and interrupts the ARC600 processor 3280 to indicate data is ready.

Turning now to the ONFI HIM 3220 and the FIM 3260 in more detail, the ONFI HIM 3220 comprises an ONFI interface 3350 that operates either in an asynchronous mode or a source synchronous mode, which is part of the ONFI standard. (Asynchronous (or "async") mode is when data is latched with the WE# signal for writes and the RE# signal for reads. Source synchronous (or "source (src) sync") is when the strobe (DQS) is forwarded with the data to indicate when the data should be latched.) The ONFI HIM 3200 also contains a command FIFO 3360, a data FIFO 3370, a data controller 3380, a register configuration module 3400, a host direct memory access ("HDMA") module 3380, and a CRC module 3415, which function as described above in conjunction with FIG. 8A. The ONFI HIM 3200 further contains an APB interface 3390 and an AHB port 3420 for communicating with the APB bus 3330 and the AHB bus 3270, respectively. The FIM 3260 comprises an EDC module 3450 that includes an EDC encoder and an EDC decoder, a flash protocol sequencer ("FPS") 3430, which generates commands to the NAND bus based on micro-control codes provided by the flash control RISC 3250 or the ARC600 microprocessor 3280, an FDMA 3440, a data scrambler/de-scrambler 3470 and a NAND interface 3460.

The scrambler/descrambler 3470 performs a transformation of data during both flash write transfers (scrambling) and flash read transfers (de-scrambling). The data stored in the flash memory device(s) 330 may be scrambled in order to reduce data pattern-dependent sensitivities, disturbance effects, or errors by creating more randomized data patterns. By scrambling the data in a shifting pattern across pages in the memory device(s) 330, the reliability of the memory can be improved significantly. The scrambler/descrambler 3470 processes data on-the-fly and is configured by either the ARC600 processor 3280 or the Flash Control RISC 3250 using register accesses. ECC check bit generation is performed after scrambling. ECC error detection is performed prior to de-scrambling, but correction is performed after descrambling.

The NAND controller in this embodiment processes write and read operations generally as described above with respect to FIG. 8A. For example, for a write operation, the command FIFO 3360 and the data FIFO 3370 store an incoming write command and data, and the CRC module 3415 checks the incoming information to determine if any transmission errors are present. If no errors are detected, the data controller 3380 decodes the command received from the command FIFO 3360 and stores it in a command register in the register configuration module 3400. The address received from the host controller is stored in the address register in the register configuration module 3400. The data received from the host controller is sent through the HDMA 3410 to the DRAM 3220. The data controller 3380 then sends an interrupt to the ARC600 3280 or the Flash Control RISC 3250, which reads the command from the command register, reads the address from the address register, and passes control to the flash control RISC 3250 to set up the FIM 3260 to start reading the data from DRAM 322 and perform ECC and data scrambling operations, the result of which is sent to the flash memory device(s) 330 for storage. The ARC600 microprocessor 3280 and/or the FIM 3260 can perform additional operations. For example, the FIM 3260 can perform column replacement, and the following operations can be performed using the ARC600 microprocessor 3280 together with the FIM 360: bad block and spare block management, safe zones, read scrubbing, and wear leveling. These operations are described in more detail below.

For a read operation, the ONFI HIM 3200 sends an interrupt to the ARC600 microprocessor 3280 when a read command is received. The ARC600 microprocessor 3280 then passes the command and address information to the flash control RISC 3250, which sets up the FPS 3430 to generate a read command to the NAND flash memory device(s) 330. Once the data is ready to be read from the NAND flash memory device(s) 330, the FPS 3430 starts sending read commands to the NAND bus. The read data goes through the NAND interface unit 3460 to the data descrambler 3470 and then through the EDC module 3450, which generates the syndrome bits for ECC correction. The data and syndrome bits are then passed through the FDMA 3440 and stored in the DRAM 3220. The flash control RISC 3250 then sets up the ECC correction engine 3230 to correct any errors. The encrypt module 3300 can decrypt the data at this time. The ARC600 microprocessor 3280 then receives an interrupt and programs the register configuration module 3400 in the ONFI HIM 3200 to state that the data is ready to be read from the DRAM 3220. Based on this information, the ONFI HIM 3200 reads the data from the DRAM 3220 and stores it in the data FIFO 3370. The ONFI HIM 3200 then sends a ready signal to the host controller to signal that the data is ready to be read.

As mentioned above, unlike other HIMs, an ONFI HIM receives several smaller-sized requests (e.g., for individual pages) from a host controller, so the ONFI HIM is required to simultaneously handle multiple (e.g., eight) read and write requests. In this way, there is more bi-directional communication between the ONFI HIM and the host controller than with other HIMs. Along with this increased frequency in communication comes more parallel processing to handle the multiple read and write requests.

Figure 8C:
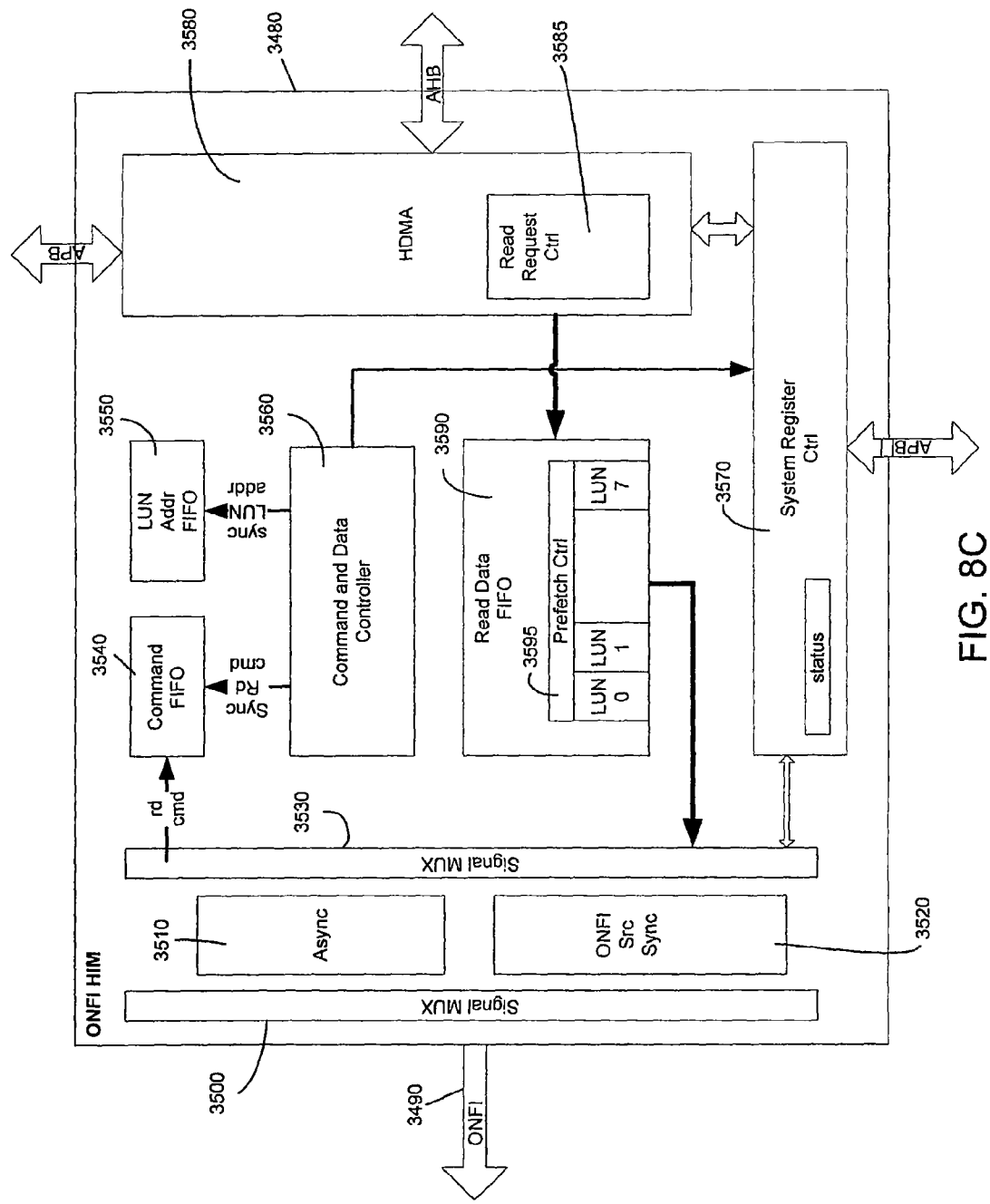
Figure 8D:
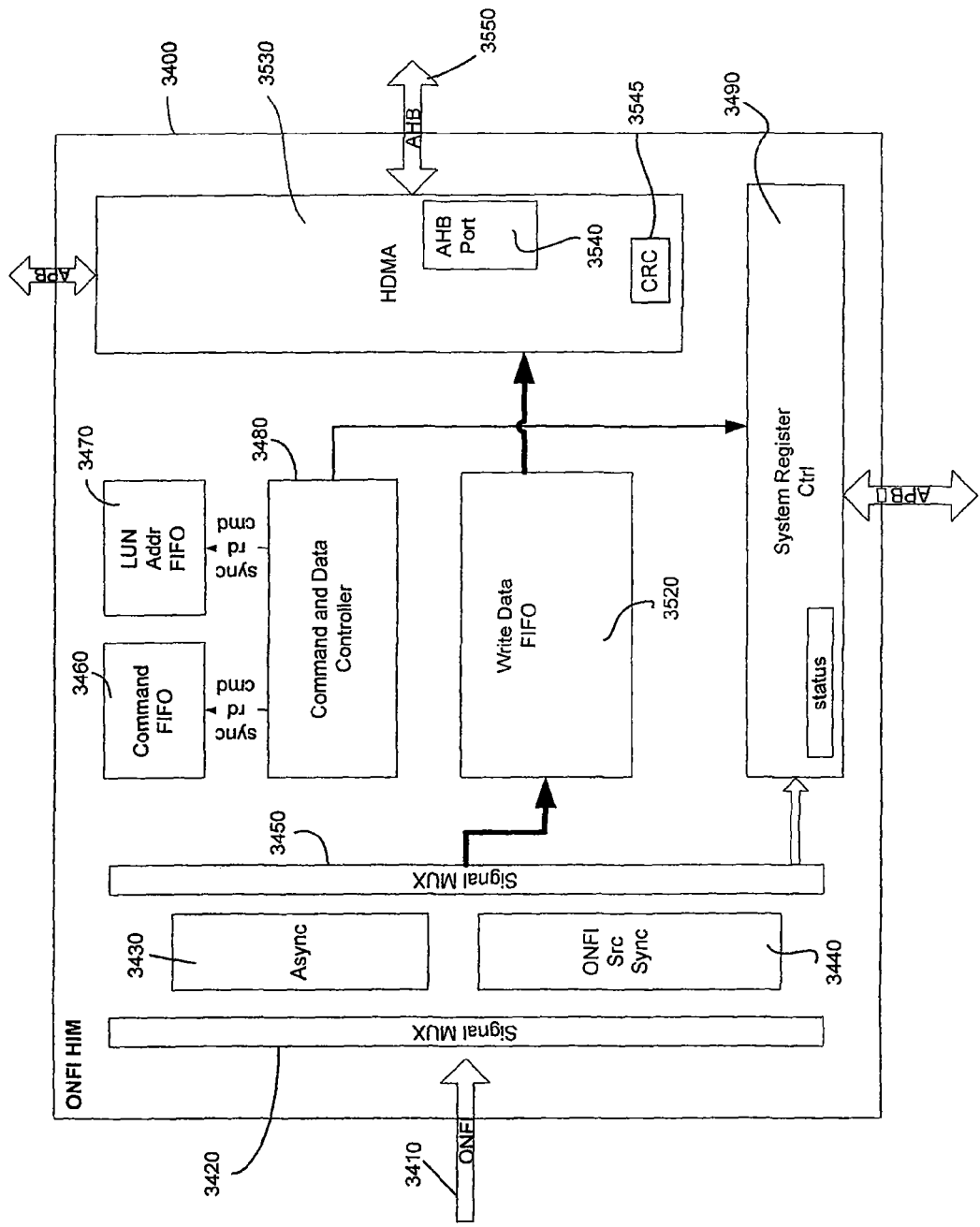

FIGS. 8C and 8D illustrate the logical operations of an ONFI HIM for read and write operations, respectively. Turning first to FIG. 8C, the ONFI HIM 3480 of this embodiment receives a read command from a host controller through an ONFI bus 3490. The ONFI HIM 3480 can operate in an asynch or a source synch mode and communicates the read command to a command FIFO 3540 via signal multiplexors 3500, 3530. (The ONFI HIM 3480 can be used in an async mode and source sync mode using the Async and ONFI source sync components 3510, 3520, respectively.) The ONFI HIM 3480 also stores the address received from the host controller in a logical unit number ("LUN") address FIFO 3550. (The NAND controller in this embodiment supports multiple logical units, which are treated as independent entities that are addressable by LUN addresses.) The command and address are read from the FIFOs 3540, 3550 into a command and data controller 3560, which synchronizes these items. The command and data controller 3560 then sends an interrupt to the system register controller 3570, which generates an interrupt to the ARC600 microcontroller. The ARC600 microcontroller then reads the LUN address from the register in the system register controller 3570, and the process of reading data from the flash memory device(s) is as described above. When all the read data is written to the DRAM, the ARC600 microprocessor program the status register in the system register controller 3570 to inform the ONFI HIM 3480 that the data is ready to be read. The ONFI HIM 3480 then reads the data through the HDMA 3580 using the read request control unit 3585. The read data is stored in the read data FIFO 3590, which is partitioned for each LUN 3595. Once that is done, a ready indicator is stored in the status register, and the data is streamed to the host controller.

Turning now to FIG. 8D, in a write operation, a write command is received from a host controller through an ONFI 3410 bus. The ONFI HIM 3400 communicates the write command to a command FIFO 3460 via signal multiplexors 3420, 3450. (The ONFI HIM 3400 can be used in an async mode and source sync mode using the Async and ONFI source sync components 3430, 3440, respectively.) The ONFI HIM 3400 also stores the address received from the host controller in a logical unit number ("LUN") address FIFO 3470. The data received from the host controller is stored in a write data FIFO 3520. The command and address are read from the FIFOs 3460, 3470 into a command and data controller 3480, which synchronizes these items. The command and data controller 3480 then sends an interrupt to the system register controller 3490, which generates an interrupt to the ARC600 microcontroller. The ARC600 microcontroller then reads the LUN address from the register in the system register controller 3490, and the process of setting-up the controller from a write operation is as described above. The HDMA 3530 has an AHB port 3540 in communication with the AHB bus 3550 and sends the data to the DRAM. The CRC module 3545 checks for transmission errors in the data. Once the data has been stored in the flash memory device(s) 330 and the flash memory device(s) 330 indicate ready and the status of program operation is successful or fail, a ready indicator is stored in the status register in the system register controller 3490, indicating that the ONFI HIM 3400 is ready for another command from the host controller.

Returning to FIG. 8A, the NAND controller 300 can also handle program failures and erase failures. As the NAND flash memory device(s) 330 attached to the flash interface module 3020 (hereafter FIM) are programmed, the NAND memory device(s) 330 report the success or failure of the program operation to the NAND controller 300 (or optionally to the ONFI Host through the host interface module 3010 (hereafter HIM)). The NAND memory device(s) 330 may experience some number of program failures over the expected life of the memory due to defects in the NAND cells or due to the limited endurance the NAND cells have with regard to erase and program cycles.

The NAND memory device(s) 330 will return a FAIL status to the controller 300 when the program page operation does not complete successfully. The controller processor 3040 (FIG. 8A) or flash protocol sequencer 3430 (FIG. 8B) verifies the success or failure of each program page operation. Generally, the failure of any single program page operation will cause the processor 3040 (or optionally the ONFI Host) to regard the entire NAND block (which may contain multiple pages) to be defective. The defective block will be retired from use. Typically, the controller 300 will copy the data that was not successfully programmed and any data in preceding pages in the defective block to another replacement block (a spare block). The controller 300 may read preceding pages into the BRAM 3050 using the FIM 3020, the data de-scrambler 3190, and the ECC decoder 3170 and applying ECC correction as needed. The data is then written to the replacement block using the FIM 3020 in the normal fashion.

One aspect of program failures is that a failure programming one page may corrupt data in another page that was previously programmed. Typically, this would be possible with MLC NAND memory which is organized physically with upper and lower logical pages sharing a word-line within the memory array. A typical usage would be to program data into a lower page and subsequent data into the upper page. One method to prevent the loss of data in the lower page when a program failure occurs when programming the upper page on the word-line is to read the lower page data prior to programming the upper page. The lower page data could be read into the controller BRAM 3050 and could additionally be programmed into a scratch pad area in the non-volatile flash memory device(s) 330, sometimes called a "safe zone." The data thus retained in the BRAM 3050 or safe zone would then be protected from loss due to a programming failure and would be available to be copied to the replacement block, particularly in cases where the data was corrupted in the lower page of the NAND memory device(s) 330 and could no longer be read successfully.

It is possible that some NAND failure modes could similarly corrupt data in other areas of the memory array, such as on adjacent word lines. This method of reading other potentially vulnerable data into the controller BRAM 3050, and/or saving the data into a scratch pad or safe zone area could also be used to protect data in these circumstances.

As the NAND flash memory device(s) 330 attached to the FIM 3020 are erased, the NAND memory device(s) 330 report the success or failure of the block erase operation to the NAND controller 300 (or optionally to the ONFI Host through the HIM 3010). The NAND memory device(s) 330 will return a FAIL status to the controller 300 when the erase operation does not successfully complete. The controller processor 3040 or circuits in the flash protocol sequencer 3430 verifies the success or failure of each erase operation. Generally, the failure of any erase operation will cause the processor 3040 (or ONFI Host) to regard the entire NAND block to be defective. The defective block will be retired from use and a spare block used in its place.

The NAND controller 300 can also handle program disturbs, erase disturbs, and read disturbs within the flash memory device.

The internal NAND programming operations could possibly effect, or disturb, other areas of the memory array, causing errors when attempting to read those other areas. One method to prevent failures from program disturb is to perform reads or "read scrubbing" operations on potentially vulnerable areas in conjunction with programming operations, in order to detect disturb effects before they become uncorrectable or unrecoverable errors. Once a disturb condition is detected (by high soft error rates during the read scrubbing operation), the controller processor 3040 (or the external ONFI host) can copy the data to another area in the flash memory device(s) 330.

The internal NAND erase operations could possibly effect, or disturb other areas of the memory array, causing errors when attempting to read those other areas. One method to prevent failures from erase disturb is to perform reads or "read scrubbing" operations on potentially vulnerable areas in conjunction with erase operations, in order to detect disturb effects before they become uncorrectable or unrecoverable errors. Once a disturb condition is detected, the controller processor 3040 (or the external ONFI host) can copy the data to another area in the flash memory device(s) 330.

The internal NAND read operations could possibly effect, or disturb other areas of the memory array, causing errors when attempting to read those other areas. The disturb effects can sometimes accumulate over many read operations. One method to prevent failures from program disturb is to perform reads or "read scrubbing" operations on potentially vulnerable areas in conjunction with read operations, in order to detect disturb effects before they become uncorrectable or unrecoverable errors. Once a disturb condition is detected, the controller processor 3040 (or the external ONFI host) can copy the data to another area in the flash memory device(s) 330.

Referring now to FIG. 8A, the NAND controller 300 handles read errors in the following manner. Typically, the data that is programmed into the NAND memory device(s) 330 through the FIM 3020 has an error detection or error correction code appended and stored with the data in the NAND array. The controller 300 uses the ECC encoder 3160 for this function. When such data is read from the flash array to the BRAM 3050, the ECC decoder 3170 re-generates the ECC code from the data and compares it to the ECC code that was appended to the data when programmed into the flash. If the data is identical to the data that was written, the ECC circuits indicate that there is no data error present. If some difference in the read data is detected, and the difference is small enough to be within the capability of the ECC to correct, the read data (typically contained in the BRAM 3050) is "corrected" or modified to restore it to the original value by the ECC correction engine 3060, as controlled by the processor 3040. If the data errors exceed the ECC correction capability, an "uncorrectable" read error occurs. Typically, an uncorrectable read error would result in an error status being returned to the Host interface when read.

One method to prevent uncorrectable read errors, or to recover when an error is detected, is for the controller 300 (or the external ONFI host) to retry the read operation. The retry may use shifted margin levels or other mechanisms to decrease the errors within the data, perhaps eliminating the errors or reducing the number of errors to a level that is within the ECC correction capability.

Optionally, when a read error is recovered, or if the amount of ECC correction needed to recover the data meets or exceeds some threshold, the data could be re-written to the same or to another block in order to restore the data to an error-free or improved condition. The original data location may optionally be considered as defective, in which case it could be marked as defective and retired from use.

Referring again to FIG. 8A, the NAND controller 300 can also handle write aborts. Write aborts are the unexpected loss of power to the controller 300 and NAND memory device(s) 330 while a program or erase operation is in progress. The loss of power can result in incomplete programming or erase conditions in the NAND memory device(s) 330 that could result in uncorrectable read errors. In some cases, such as with MLC NAND, other pages that share a word line (i.e., a lower page) could be corrupted by an aborted program operation on the upper page of a word line, much like the program failure condition described above.

There are several methods to reduce or eliminate write abort errors, or minimize their impact. One method is to use a low voltage detection circuit to notify the processor 3040 that the power has been interrupted. The processor 3040 can then allow current program or erase operations to finish but not allow new operations to start. Ideally, the current operations would have enough time with sufficient power to complete.

An alternative method, perhaps used in conjunction with the low voltage detection method, is to add capacitance or a battery (or some alternative power supply source) to the power supply circuits to extend the power available to complete program or erase operations.

Another method is to provide a scratch pad "safe zone" similar to that described above. Any "old" data that exists in lower pages that may be vulnerable during an upper page program could be read and saved in the safe zone before the upper page program is started. That would provide protection for previously-programmed data in case of a power loss event. In some implementations, it may be acceptable to not be able to read data that was corrupted in a write abort situation, but other possibly un-related older data must be protected.

Another method is to search for potential write abort errors when the controller is powered on. If an error is found that can be determined (or assumed) to be a result of a write abort, the error data may be discarded. In this situation, the controller 300 effectively reverts back to previous data, and the interrupted operation is as if it did not happen.

Referring again to FIG. 8A, the NAND controller 300 can also conduct wear leveling on the memory. Wear leveling is a method to increase overall product endurance and lifetime by more evenly distributing block usage amongst all physical blocks than would otherwise occur as a result of normal flash management algorithms. This is done by forcing "cold" blocks to the spare blocks pool, which will in turn be used for host data updates, and, at the same time, moving the data from "cold" blocks, which are not updated by the host, to a "hot" block. This swap will result in mixing up "hot" and "cold" blocks. The swap can be done either randomly or cyclically, choosing blocks for the swap, or choosing them on the basis of a hot count (number of program-erase cycles) analysis. The swap can be done periodically, say in every 100 block cycles, typically calibrated by a system parameter to balance between overall system performance and evening of block usage to balance wear and performance overhead.

An example high level sequence is:
1. Schedule wear leveling operation
2. Identify "hot" and "cold" blocks by either hot count analysis or on random or cyclic basis.
3. Copy data from the selected "cold" block to the selected "hot" free block in the free block pool.
4. Release the "cold" block to the free block pool. As a result, the free block pool is populated by a cold block instead of hot one.

Some operations can be skipped, like analysis-based blocks selection. The wear level operation itself can also be skipped if block wear distribution is detected as even.

The wear level operations and hot count management are performed in firmware by the processor 3040, such that the host controller 121 (FIG. 3) will not be aware of these housekeeping flash block level operations Referring to FIG. 8A, the controller 300 can also implement read scrubbing on the flash memory device(s) 330 upon detection of a read disturb. Read operations to one area of the NAND memory array within the flash memory device(s) 330 may affect or disturb other areas of the memory array, causing cells to shift from one state to another, and ultimately causing bit errors when attempting to read data previously stored to those other areas. The disturb effects can accumulate over many read operations, eventually leading to a number of bit errors that may exceed the data correction capabilities of the system. The errors that exceed the system correction capabilities are referred to as uncorrectable errors. One method to prevent failures from program disturbs is to perform reads or "scrubbing" operations on potentially vulnerable areas, in order to detect disturb effects before they become uncorrectable or unrecoverable errors. Once a disturb condition is detected, typically by detecting that there are a number of bits in error on the data read, the processor 3040 can move the data to another area in the memory generally by copying the data to another area of the NAND memory array in order to "refresh" it.

Read scrub copy is usually triggered by correctable ECC error discovered by the ECC correction engine 3060 (FIG. 8A), either in blocks read during the course of a host read operation, an internal system read operation, or by a scheduled read scrub scan. System read operations are those needed by the flash storage system to read firmware, parameters, or mapping information stored in the NAND flash. Read scrub scan is a read of all data in a block to determine whether any data contained therein has been disturbed. Blocks are selected for a read scrub scan typically when they have been partially read during the course of a host read or system read operation, but may also be selected using other criteria, such as randomly, or via deterministic sequencing through the blocks of memory. Because a read scrub scan operation takes time and affects data throughput of the system, the system may select blocks for read scrub scan only periodically or infrequently, by use of a random selection, a counter, or other mechanisms. The frequency of scheduling may be calibrated to balance between the system performance needs, and the frequency require to detect disturbed data before it becomes uncorrectable. Upon detection of a correctable error that has some number of bits in error above a pre-defined threshold, the read scrub copy is scheduled for the block.

Read scrub copy is a method by which data is read from the disturbed block and written to another block, after correction of all data which has correctable ECC error. The original block can then be returned to the common free block pool and eventually erased and written with other data. Read scrub scan and read scrub copy scheduling will be done in the NAND controller 300 in firmware by the processor 3040, such that the host controller 121 will not be aware of these housekeeping flash block level operations.

CONCLUSION

It is intended that the foregoing detailed description be understood as an illustration of selected forms that the invention can take and not as a definition of the invention. It is only the following claims, including all equivalents that are intended to define the scope of this invention. Also, some of the following claims may state that a component is operative to perform a certain function or configured for a certain task. It should be noted that these are not restrictive limitations. It should also be noted that the acts recited in the claims can be performed in any order—not necessarily in the order in which they are recited.

What is claimed is:

1. A method for performing a sequence of commands, the method comprising:
    performing in a controller in communication with a host and a flash memory device:
        receiving a command from the host to perform a memory operation in the flash memory device, wherein the command comprises at least one bit that indicates whether the command is a stand-alone command or is part of a sequence of commands;
        analyzing the at least one bit to determine whether the at least one bit indicates that the command is a stand-alone command or is part of a sequence of commands;
        if the at least one bit indicates that the command is a stand-alone command, performing the command; and
        if the at least one bit indicates that the command is part of a sequence of commands, performing the command as part of the sequence of commands, wherein each of the commands in the sequence of commands includes a command code.

2. The method of claim 1, wherein the flash memory device is organized into a plurality of planes, and wherein each command in the sequence of commands is performed in a different one of the plurality of planes.

3. The method of claim 1, wherein the sequence of commands comprises an atomic command sequence, and wherein the commands in the sequence of commands are performed together as a group.

4. The method of claim 1, wherein the sequence of commands comprise sequential commands with incremental addresses.

5. The method of claim 1, wherein the at least one bit is a single bit.

6. The method of claim 5, wherein the single bit is one of a plurality of reserved address bits.

7. The method of claim 1, wherein at least one bit in a last command in the sequence of commands indicates that the command is a stand-alone command.

8. The method of claim 1, wherein the sequence of commands are received by the controller one command at a time.

9. The method of claim 8 further comprising sending a response back to the host either after the entire sequence of commands have been received or after each command in the sequence of commands has been received.

10. A controller for performing a sequence of commands, the controller comprising:
    a first interface configured to transfer data between a host and the controller;
    a second interface configured to transfer data between the controller and a flash memory device; and
    circuitry operative to:
        receive a command from the host to perform a memory operation in the flash memory device, wherein the command comprises at least one bit that indicates whether the command is a stand-alone command or is part of a sequence of commands;
        analyze the at least one bit to determine whether the at least one bit indicates that the command is a stand-alone command or is part of a sequence of commands;
        if the at least one bit indicates that the command is a stand-alone command, perform the command; and
        if the at least one bit indicates that the command is part of a sequence of commands, perform the command as part of the sequence of commands, wherein each of the commands in the sequence of commands includes a command code.

11. The controller of claim 10, wherein the flash memory device is organized into a plurality of planes, and wherein each command in the sequence of commands is performed in a different one of the plurality of planes.

12. The controller of claim 10, wherein the sequence of commands comprises an atomic command sequence, and wherein the commands in the sequence of commands are performed together as a group.

13. The controller of claim 10, wherein the sequence of commands comprise sequential commands with incremental addresses.

14. The controller of claim 10, wherein the at least one bit is a single bit.

15. The controller of claim 14, wherein the single bit is one of a plurality of reserved address bits.

16. The controller of claim 10, wherein at least one bit in a last command in the sequence of commands indicates that the command is a stand-alone command.

17. The controller of claim 10, wherein the sequence of commands are received by the controller one command at a time.

18. The controller of claim 17, wherein the processor is further operative to send a response back to the host either after the entire sequence of commands have been received or after each command in the sequence of commands has been received.

19. The controller of claim 10, wherein at least one of the first and second interfaces comprises a NAND interface configured to transfer data using a NAND interface protocol.

20. The controller of claim 10, wherein both the first and second interfaces comprise a NAND interface configured to transfer data using a NAND interface protocol.

* * * * *